United States Patent [19]
Lazzara et al.

[11] Patent Number: 5,799,062
[45] Date of Patent: Aug. 25, 1998

[54] SYSTEMS AND METHODS FOR INTEGRATING TELEPHONE AND SECURITY DEVICES

[75] Inventors: Sal Lazzara, Bellingham; Donald C. Sorenson, Lynden, both of Wash.

[73] Assignee: Allsop, Inc., Bellingham, Wash.

[21] Appl. No.: 813,912

[22] Filed: Mar. 7, 1997

[51] Int. Cl.$^6$ .................................................. H04M 11/04
[52] U.S. Cl. ............................ 379/51; 379/40; 379/184
[58] Field of Search ........................ 379/38–40, 45, 379/50, 51, 93.02, 93.05, 184, 194, 195, 354–356, 377, 387, 441, 442

[56] References Cited

U.S. PATENT DOCUMENTS

| | | | |
|---|---|---|---|
| 3,715,502 | 2/1973 | Martin | 179/2 C |
| 4,041,242 | 8/1977 | Churchill | 179/2 A |
| 4,640,988 | 2/1987 | Robinton | 379/93.05 |
| 4,726,048 | 2/1988 | Waldman et al. | 379/7 |
| 5,140,631 | 8/1992 | Stahl | 379/377 |
| 5,291,545 | 3/1994 | Stahl | 379/98 |
| 5,465,297 | 11/1995 | Azem | 379/387 |

OTHER PUBLICATIONS

Modern Communication Systems, Principles and Applications, Leon W. Chouch II, Prentice Hall 1995.
Avenger IX Alarm System, Model AV–9000, Scantronic Installation & Programming Instructions, undated.

*Primary Examiner*—Wing F. Chan
*Attorney, Agent, or Firm*—Michael R. Schacht; Hughes & Schacht, P.S.

[57] ABSTRACT

A system or method for interconnecting a security system with a telephone system. The system comprises one or more lockout modules that are connected between non-priority telephone devices and a telephone line. A security panel is directly connected to the telephone line. The lockout modules comprise a switch means for disconnecting the telephone device attached thereto from the telephone line when the security panel connects to the telephone line. The lockout modules further comprise a latch device that gives the first non-priority telephone device to connect to the line exclusive use of the line against other non-priority telephone devices. The lockout module further comprises a circuit that inhibits the reconnection of the telephone devices to the line to allow the security panel to recover a high and dry telephone line. The lockout module may be modified to include a switch that allows other non-priority telephone devices to share the line.

41 Claims, 12 Drawing Sheets

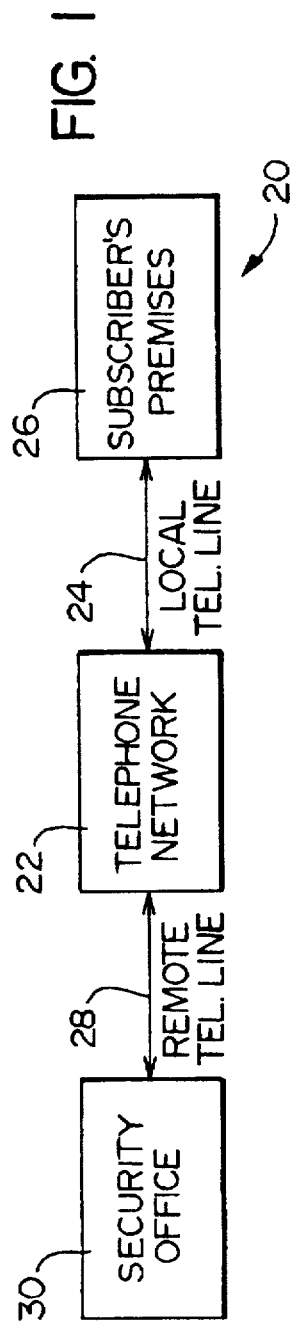
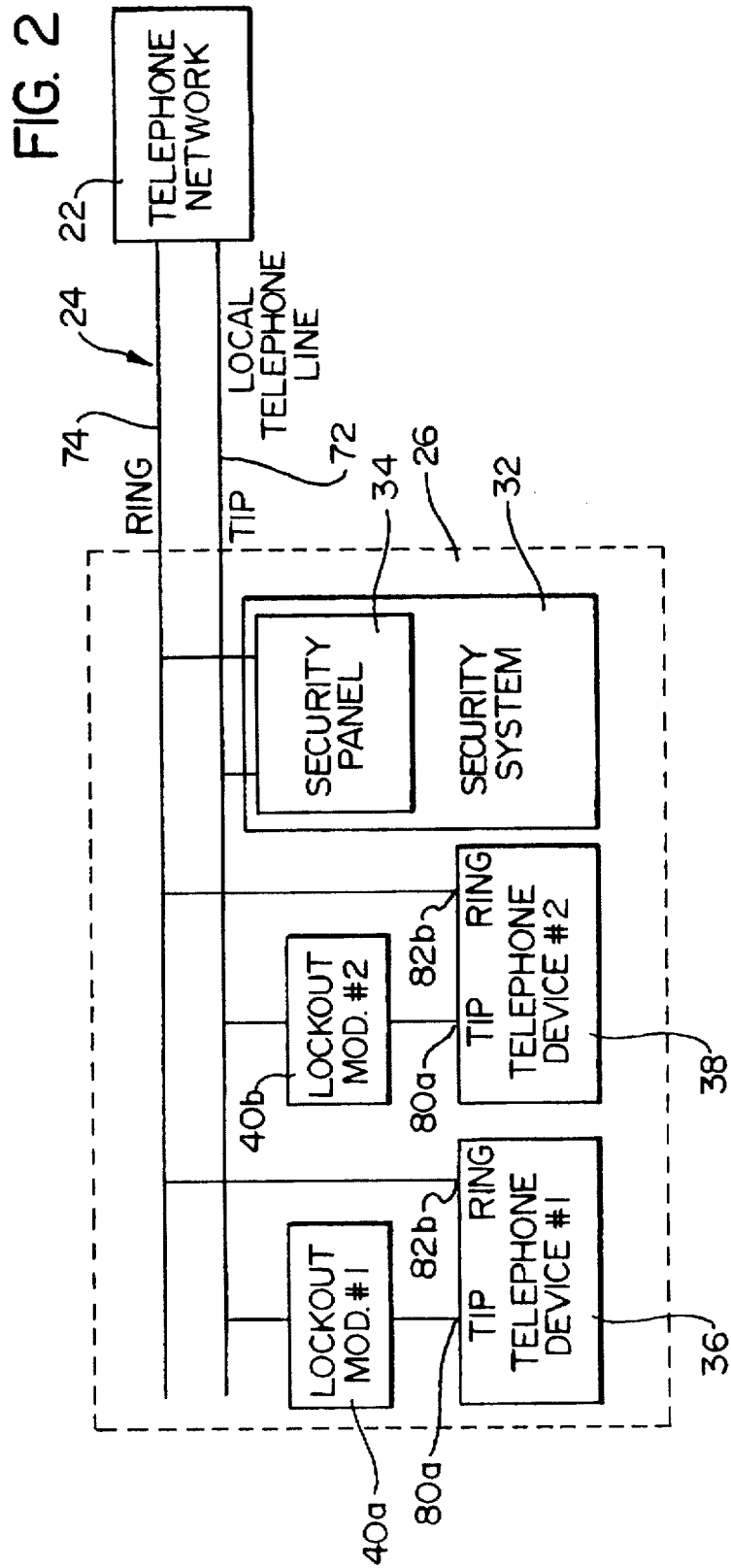

SYSTEMS AND METHODS FOR INTEGRATING TELEPHONE AND SECURITY DEVICES

TECHNICAL FIELD

The present invention relates to systems and methods for integrating telephone and security systems and, more particularly, to systems and methods that determine whether access to a single telephone line is given to a telephone device or to a security system.

BACKGROUND OF THE INVENTION

A vast majority of modern offices and/or residences are provided with telephone connections that allow communications to other locations. Such connections normally comprise one or more telephone lines that are physically connected to telephony equipment located at a local telephone company's central office. As is well-understood in the art, the local central office is in turn connected to other local central offices through one or more long distance service providers.

For the purposes of this application, the phrase "telephone network" will refer to telephony equipment located outside a particular office or residence. The telephony equipment located within a given office or residence will be referred to herein as "telephone devices". In the context of this application, a telephone device can be any device capable of communicating over the telephone network such as a single analog telephone, a PBX system, a digital telephone system, a computer, a fax, and the like. And the term "the telephone line" refers to the two electrical conductors, commonly referred to as "TIP" and "RING", employed to connect a given telephone system to a telephone network.

Collectively, the telephone network, the telephone devices connected thereto, and the telephone lines connecting the telephone devices to the telephone network will be referred to as "the communications system".

In office settings, normally more than one telephone line is provided. In residential settings, usually only one telephone line is provided. In either situation, the telephone lines are primarily used to transmit signals between given telephone devices and the telephone network.

In addition to telephone devices, many offices and residences are provided with security systems. A security system will often include a security panel and subsystems such as fire detection systems, systems for detecting unauthorized physical entry into the office or home, systems for detecting medical emergencies, audible alarm systems, and the like.

The value of connecting security systems to the telephone communications system has long been recognized. Security systems can thus not only detect security conditions such as fires, physical break-ins, medical emergencies, and the like, but can also communicate the existence of such security conditions through the communications system to an appropriate party; the appropriate party can then take a predetermined action appropriate for the detected security condition.

For a variety of reasons, a security system cannot simply be connected to a telephone line in the same manner as other telephony equipment connected to that line. For example, if the security system needs access to a telephone line to communicate a security condition to a security service and that line is in use, the security system may not be able to communicate with the security service in a timely manner.

The current method of connecting a security system to a telephone system is to pass the telephone line through the security panel of the security system before the telephone line is connected to any telephone devices. In single family residences, while not a major undertaking, the services of a technician are required to connect the security system to a telephone line servicing that residence.

In other environments, such as office buildings, multi-family dwellings, and the like, the process of connecting the security and telephone systems is often greatly complicated because, while the security system is located in the office or residence, the physical connection to the telephone system must be made where the telephone line enters the building. Not only is a technician required to make this connection, but the cost of running wire between these locations can be quite high.

Because integration of security systems with telephone systems requires the services of a technician, such systems are normally sold by one party (a salesman) and installed by another (a technician).

Accordingly, whenever a security system is installed, at least one of the parties involved must pay for the hardware portion of the system and for the services of the technician required to install the hardware. Traditionally, these costs have been borne by the consumer. These factors have retarded the growth of the security industry.

A significant need thus exists for methods and systems that reduce the entry costs of obtaining security protection. This need is amplified by the fact that significant revenues of the security industry are generated by providing monitoring services after the original installation; the security industry cannot partake of these after-installation revenues if the barriers to entry are too high.

RELATED ART

Security systems are manufactured by many companies. In the context of the present invention, however, the details of operation of a given security system are not critical; and in fact, from the perspective of a telephone system, the manner in which a security system interconnects with the telephone system conforms to well-known standards.

Given the foregoing, a typical interface between a security system and a telephone system will be described below, with the understanding that this description will also apply to most commercially available security systems.

Initially, the security system is installed in the office or residence. The security system comprises a security panel that is mounted in a secure, unobtrusive location within the office or residence. The security panel has a terminal strip to which various sensors for detecting security events, such as fire, unauthorized entry, medical emergency, and the like, are connected. The terminal strip also comprises RING, TIP, RD, and TD terminals that are physically connected to the telephone system within the office or residence in which the security system is installed.

In particular, four conductors of an eight conductor cable are connected at a first end to one of the RING, TIP, RD, and TD terminals and at the other end to an RJ31-X jack. The RJ31-X jack provides a convenient way to isolate the security panel from the telephone system when trying to isolate a fault in the telephone system.

Four individual conductors are then connected to the RJ31-X jack and run to wherever the telephone line is easily accessible; usually, this is where the telephone line enters the building. In any event, the point at which these conductors are attached to the telephone line must be between the telephone network and any telephone devices within the secured area.

The four individual conductors connected to the security panel are then spliced into the two conductors that form the telephone line. In particular, the TIP conductor is cut and connected through the appropriate conductors to the TIP and TD terminals on the security panel, and the RING conductor is cut and connected through the appropriate conductors to the RING and RD terminals on the security panel.

This arrangement effectively routes the incoming telephone line through the security panel; and the security panel contains circuitry that, when required, allows the security panel to have exclusive access to the telephone line.

The security panel further comprises an autodialer to establish a connection to a security service provider over the communications system. Modern security panels further comprise means for gaining or regaining control of the line should a call be in process when the security panel requires access to the line.

Other features and specifics of modern security systems and the communications system will be explained when necessary in the following discussion.

Attempts have been made to eliminate the use of an RJ31-X jack and conductors run from the security panel to the telephone line.

For example, U.S. Pat. No. 5,465,297 to Azem describes a telephone line seizure circuit that, in theory, obviates the need for the RJ31-X jack and its associated conductors. The line seizure circuit described in the Azem patent is connected in line before each telephone device on the telephone line to be shared with the security system. The line seizure circuit continuously monitors the voltage on the telephone line for a distinct voltage that indicates that the autodialer requires the line and, if so, disconnects the telephone device associated therewith from the telephone line for a predetermined period of time.

The problems with the Azem device include the following. First, the Azem line seizure circuit requires continuous power from the telephone line; as it must always monitor the telephone line, the Azem device is continuously powered. When a number of such devices are used, they can represent a significant load on the telephone line. Second, if significant components of the Azem line seizure circuit fail by short-circuiting, this failure can prevent the security system from obtaining exclusive access to the phone line. Third, the Azem line seizure circuit is polarized, creating the possibility that it will be installed without the proper polarity. Fourth, the Azem circuit gives the autodialer control of the telephone line for only a predetermined length of time. And finally, the Azem circuit employs a relatively large number of components, with many of these components being exposed to failure by transient voltages and the like.

For these and perhaps other reasons, devices constructed in accordance to the teachings of the Azem patent are not, to the Applicant's knowledge, commercially available in the marketplace.

The following patents were uncovered as the result of a professional patentability search conducted on behalf of the Applicant but are considered less relevant than the art described above.

U.S. Pat. No. 4,726,048 to Waldman et al. discloses a telephone privacy circuit. This circuit contains a Zener diode that disconnects an attached telephone to indicate to the user of that phone that some one is listening on another extension. This prevents other extensions on a given line from eavesdropping on a conversation conducted on the telephone connected to the switch. This device is not related to the problem of priority among a number of telephone devices connected to a single line.

U.S. Pat. Nos. 5,291,545 and 5,140,631 to Stahl disclose circuits that determine the status of a telephone line. These circuits are intended to prevent an autodialer from obtaining access to a line that is off-hook, but do not give the autodialer the capability of obtaining exclusive access to a line.

U.S. Pat. No. 4,041,042 to Churchill discloses a telephone signaling system having interruption prevention, but also with means for overriding the interruption prevention when necessary. This patent describes a specialized circuit that does not address the problem of giving an autodialer exclusive access to a telephone line when necessary.

U.S. Pat. No. 3,715,502 to Martin describes an alarm coupler that allows a security system or the like to obtain exclusive access to a telephone line. This system requires a technician to connect the security panel to the telephone line at a point between the telephone network and the internal telephone system.

The Applicant is also aware of commercially available lock-out modules that are connected to a number of telephone devices attached to a single telephone line. These modules give the first telephone device connected to the line access to the line over subsequent telephone devices connected to that line. Telephone devices directly connected to the line can listen to the line but cannot disconnect previously connected telephone devices. These modules are used, for example, to connect several modems to a single line dedicated to data transmission. Such devices in no way address the problems presented by the integration of telephone and security systems.

The need thus exists for methods and systems that allow a security system to be connected to a telephone line using inexpensive parts, without the services of a technician, in a manner that does not unduly load the telephone line, and with at least some level of fault protection.

OBJECTS OF THE INVENTION

From the foregoing, it should be apparent that one primary object of the present invention is to provide systems and methods of connecting security systems to telephone systems.

Another more specific object is to provide such systems and methods having a favorable mix of the following characteristics:

- gives priority access to a telephone line to a security system;
- is functionally transparent to telephone devices connected to the telephone line (does not interfere with telephone network line interrogations or pulse dialing, handles 24 volt systems, is ring compatible with existing systems, and does not adversely affect data transport);
- does not require an external power source;
- does not create unnecessary load on the telephone line to which it is attached;
- may be inexpensively manufactured;
- may be easily installed by a non-technician;
- fault tolerant;
- non-polarized; and
- allows a security system to recover a high and dry line.

BRIEF DESCRIPTION OF THE DRAWINGS

FIG. 1 is a block diagram depicting an integrated telephone/security system constructed in accordance with, and embodying, the principles of the present invention;

FIG. 2 is a block diagram depicting the interconnection of a security system and a telephone system at a particular subscriber's residence, with more detail of the connection of these systems to the telephone network;

DETAILED DESCRIPTION

A. Integrated Telephone/Security System

Figure 3:
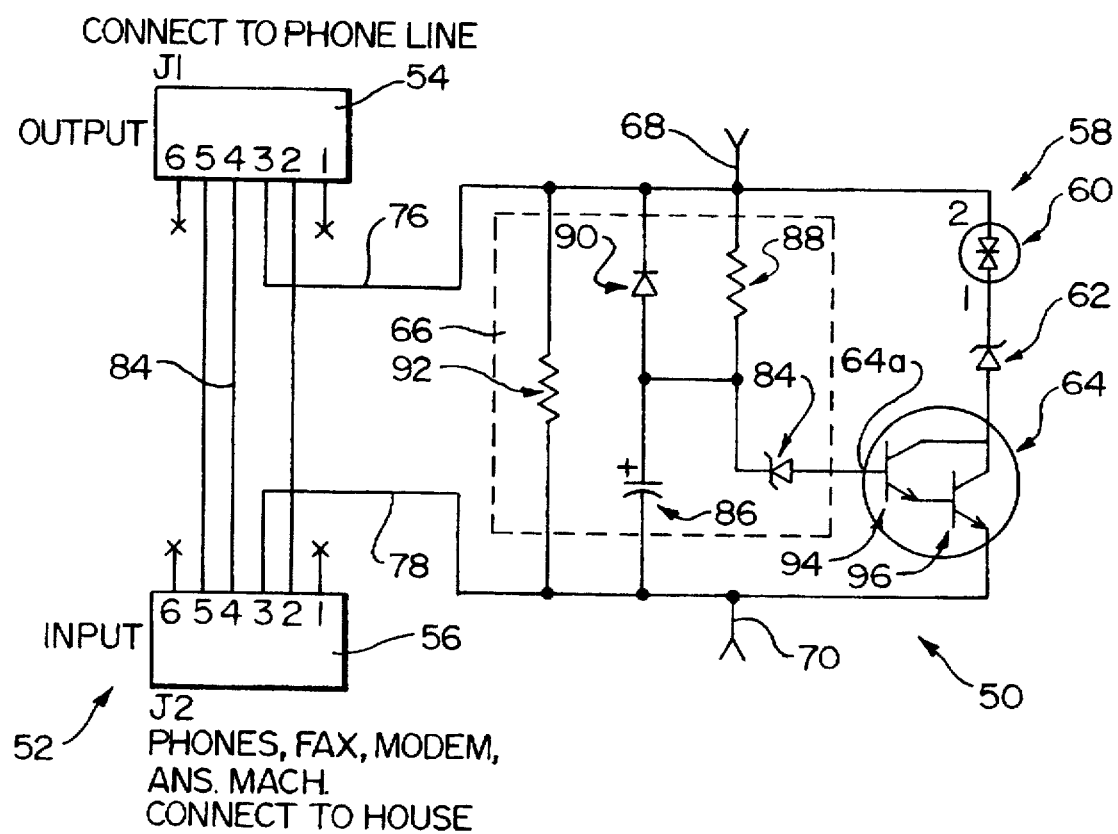
FIG. 3 is a simplified circuit diagram depicting one embodiment of a lockout circuit of the present invention.

Referring now to FIG. 1 of the drawing, depicted at 20 therein is an integrated telephone security system. This integrated system 20 comprises a telephone network 22 that is connected by a local telephone line 24 to one or more subscriber's premises 26 and by a remote telephone line 28 to a security office 30.

As shown in FIG. 2, located at each of the subscriber's premises 26 is a security system 32. Security systems such as the system 32 are well-known in the art, and the security system 32 will be described herein only to the extent necessary for a complete understanding of the present invention.

The security system 32 is configured to detect one or more security conditions at the premises such as an unauthorized entry, a fire, a medical emergency, or the like. Once such a security condition is detected, the security system 32 can be programmed to generate an alarm such that appropriate action is taken in response to the detected security condition. For many security conditions, the appropriate action includes contacting an appropriate party such as the police, the fire department, or an ambulance service.

Thus, the security system 32 can be programmed to contact the security office 30 through the telephone network 22 upon the occurrence of certain security conditions. The security office 30 is staffed and equipped by a security service that can respond appropriately to anticipated security conditions.

The security system 32 will communicate data to the security office 30 that allows the security service to determine the location of the subscriber's premises 26 and the type of security condition that exists.

More specifically, the security system 32 comprises a security panel 34 that is connected to the local telephone line 24. As is well-understood in the art, the security panel 34 contains an auto-dialer and a modem that allows a connection to be established with the security office 30 through the telephone network 22 and the appropriate data digitally transferred to the office 30.

As discussed in the background section above, the local telephone line 24 is usually not dedicated to the security system 32, but is instead also connected to one or more telephone devices such as the devices 36 and 38 depicted in FIG. 2. These devices 36 and 38 can be telephones, facsimile machines, computers, and the like. While only two telephone devices are depicted in FIG. 2, it will be understood that more than two such devices can, and frequently will, be attached to a single telephone line.

Again, the background section of this application makes it clear that, under normal circumstances, the security system 32 must be given priority when determining which device has access to the telephone line 24.

To ensure the security system 32 has this priority, a lockout module 40 is provided for each of the telephone devices 36 and 38 connected to the local telephone line 24; lockout module 40a is connected between the telephone device 36 and the telephone line 24, and lockout module 40b is connected between the telephone device 38 and the line 24.

Lockout modules that achieve all or a subset of the stated functional objectives can be implemented through any one of several circuit configurations. The following detailed descriptions cover three classes of circuit embodiments.

B. Lockout Circuits

Figure 4:
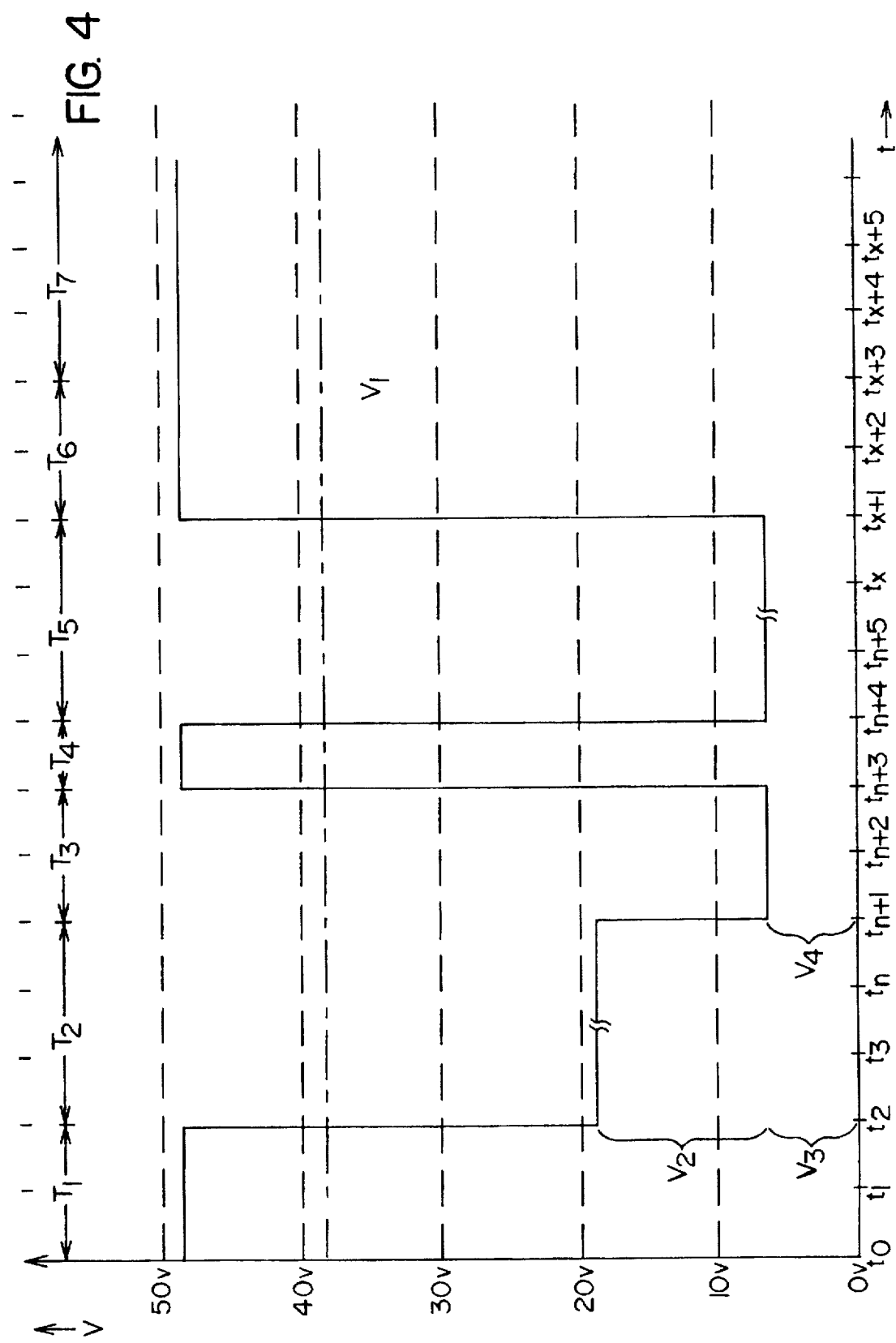
FIG. 4 is a timing diagram depicting a typical situation in which the circuit depicted in FIG. 3 is employed to disconnect a telephone device in favor of a security system.
Figure 5:
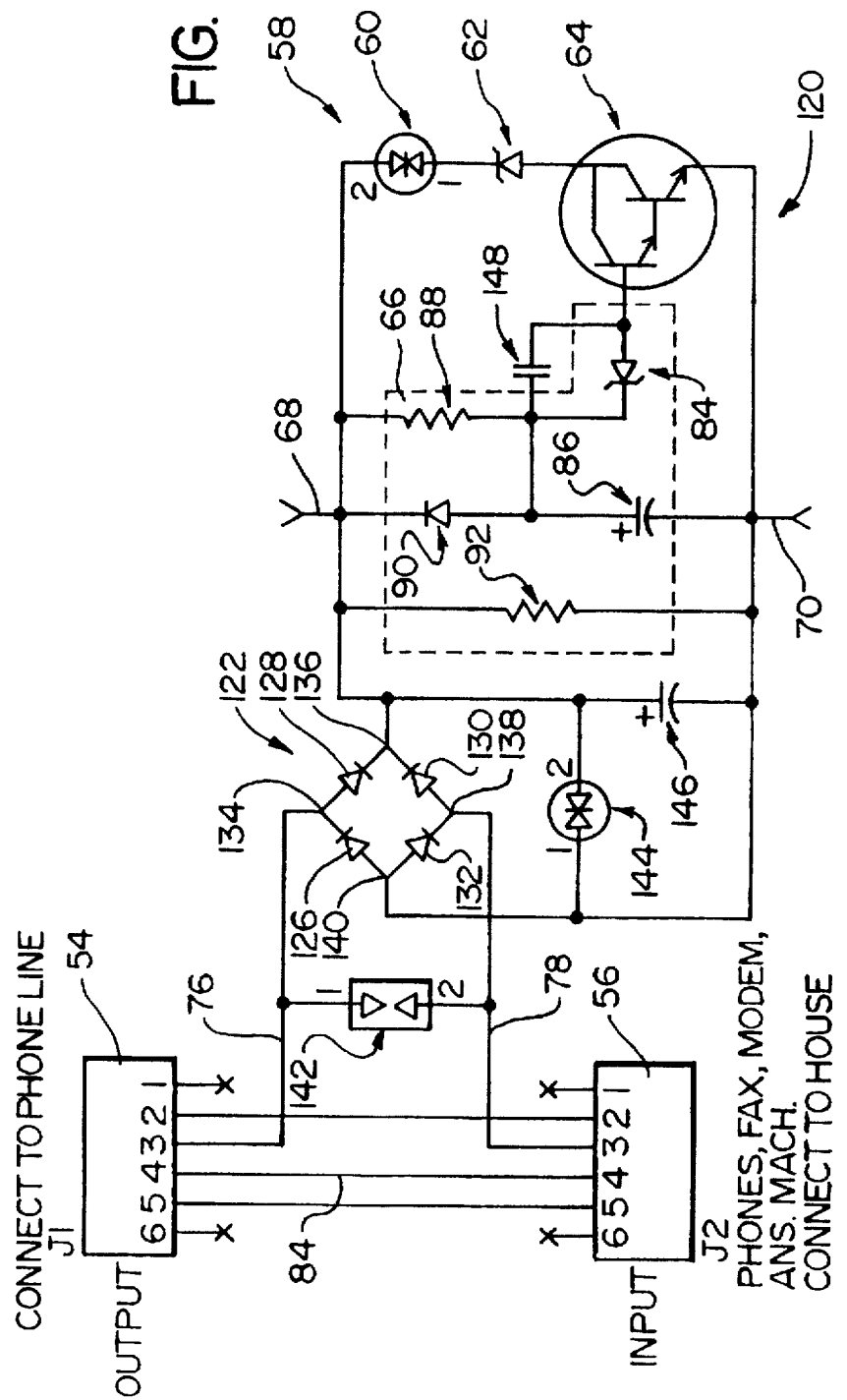
FIG. 5 is a circuit diagram depicting another lockout circuit constructed in accordance with the present invention.

FIGS. 3 through 5 and associated descriptions disclose circuit details for two voltage controlled lockout circuits that support dry-line recovery and are compatible with most modern tone-dialing telephone networks.

Figure 6:
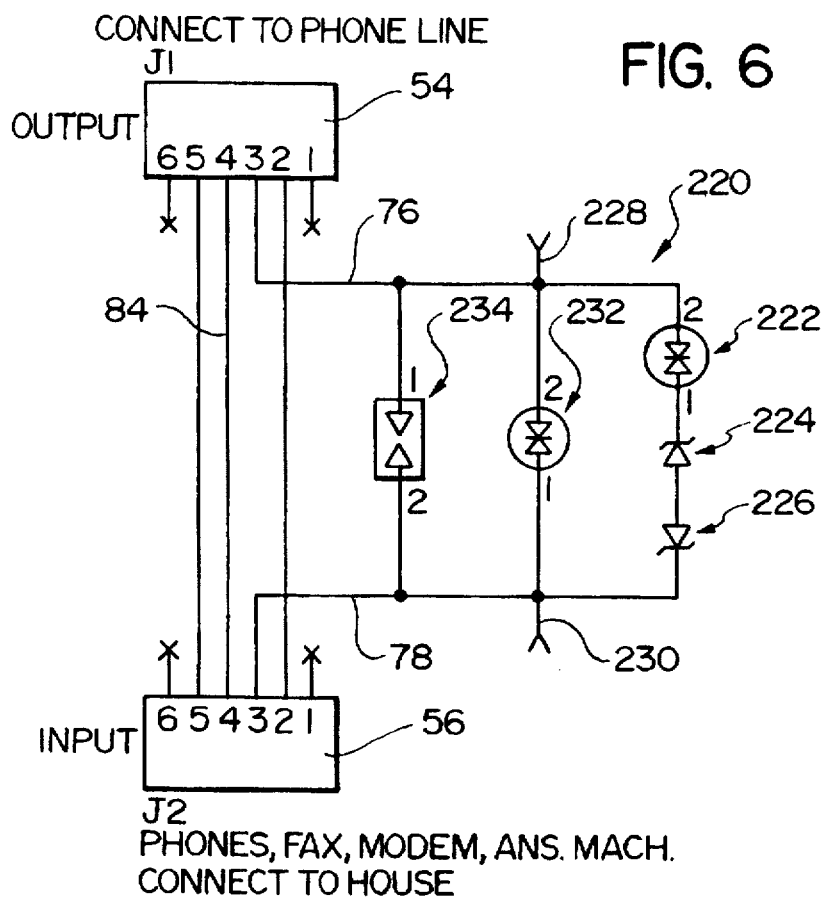
FIG. 6 is a circuit diagram depicting yet another lockout circuit of the present invention.

FIG. 6 and the associated description discloses circuit details for a simplified voltage controlled lockout circuit that does not support dry-line recovery.

Figure 8:
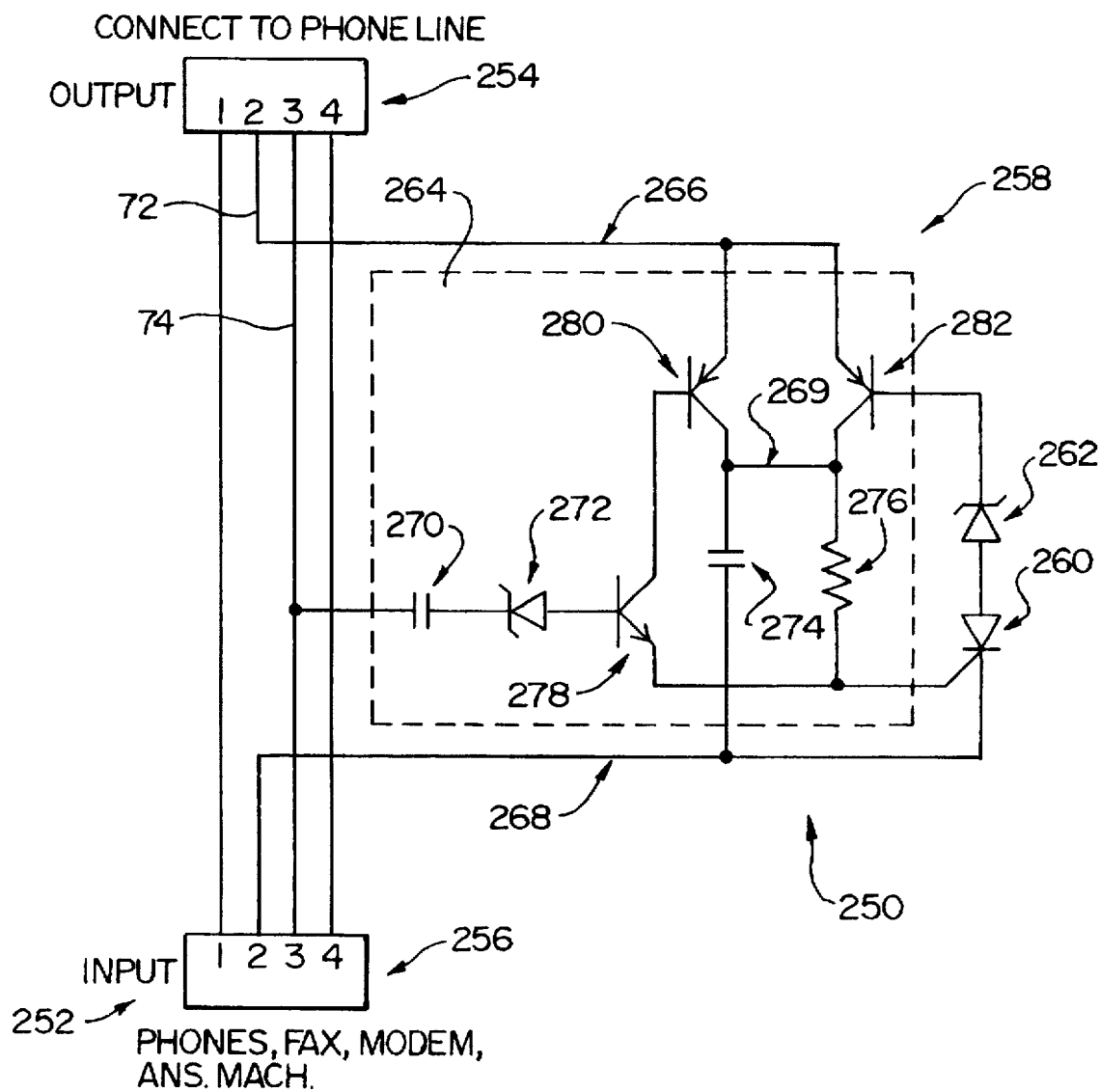
FIG. 8 is a circuit diagram depicting still another lockout circuit of the present invention.
Figure 9:
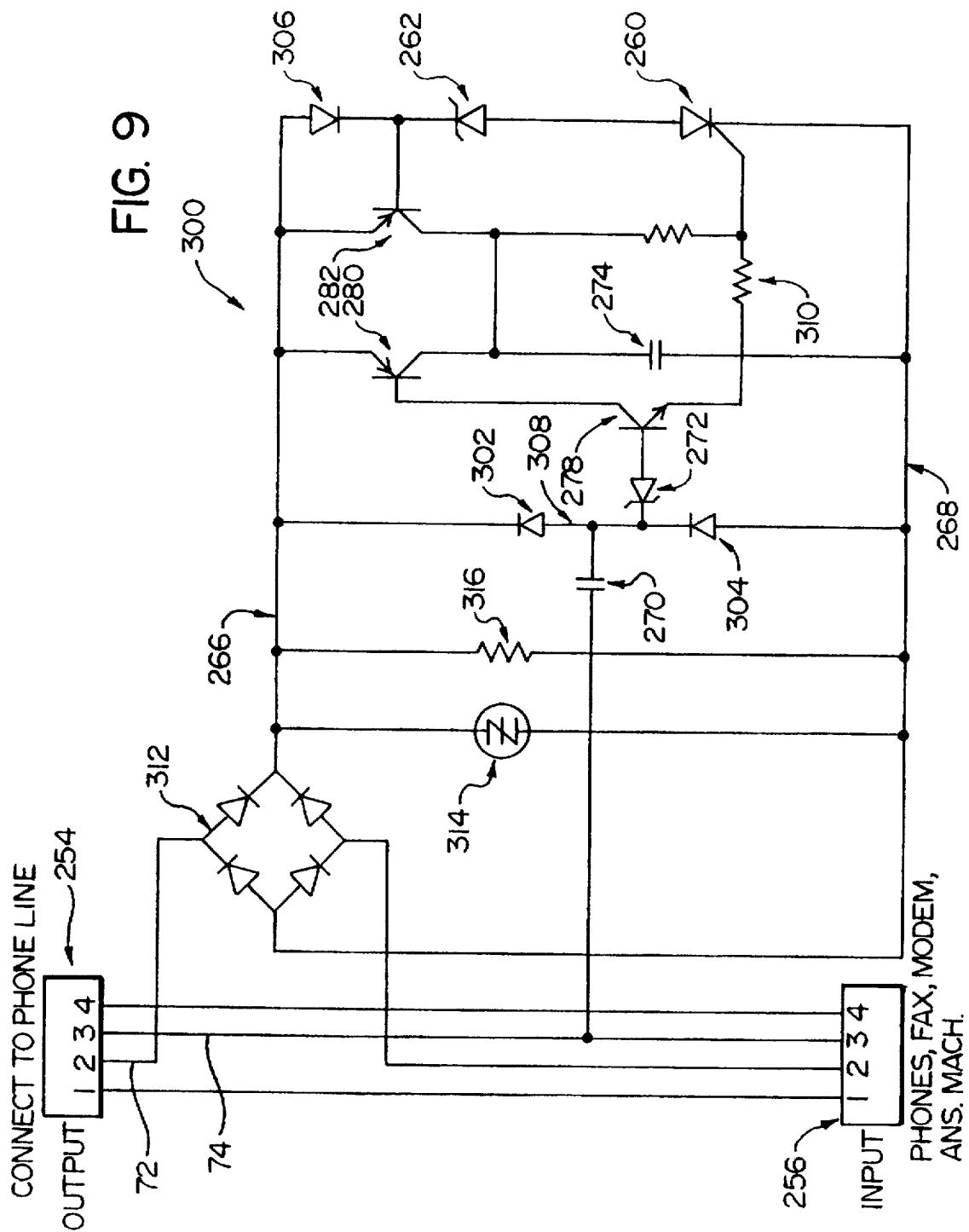
FIG. 9 is a circuit diagram depicting another lockout circuit of the present invention.

FIGS. 8 and 9 and associated descriptions disclose circuit details for hybrid voltage and current controlled lockout circuits that support dry-line recovery and provide enhanced compatibility with all public telephone networks and telephone devices, including those implementing pulse dialing.

Figure 7:
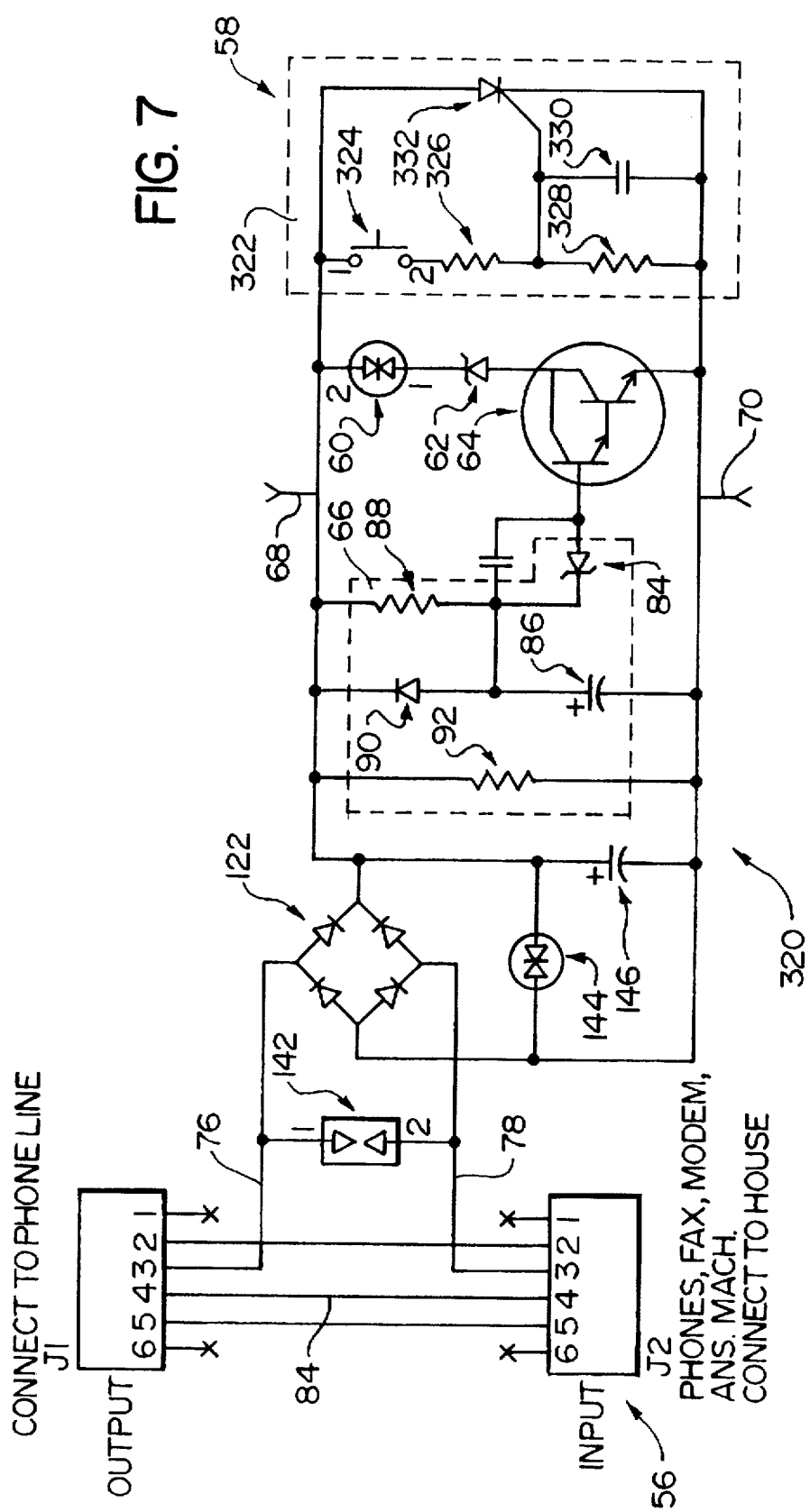
FIG. 7 is a circuit diagram depicting yet another lockout circuit of the present invention.
Figure 10:
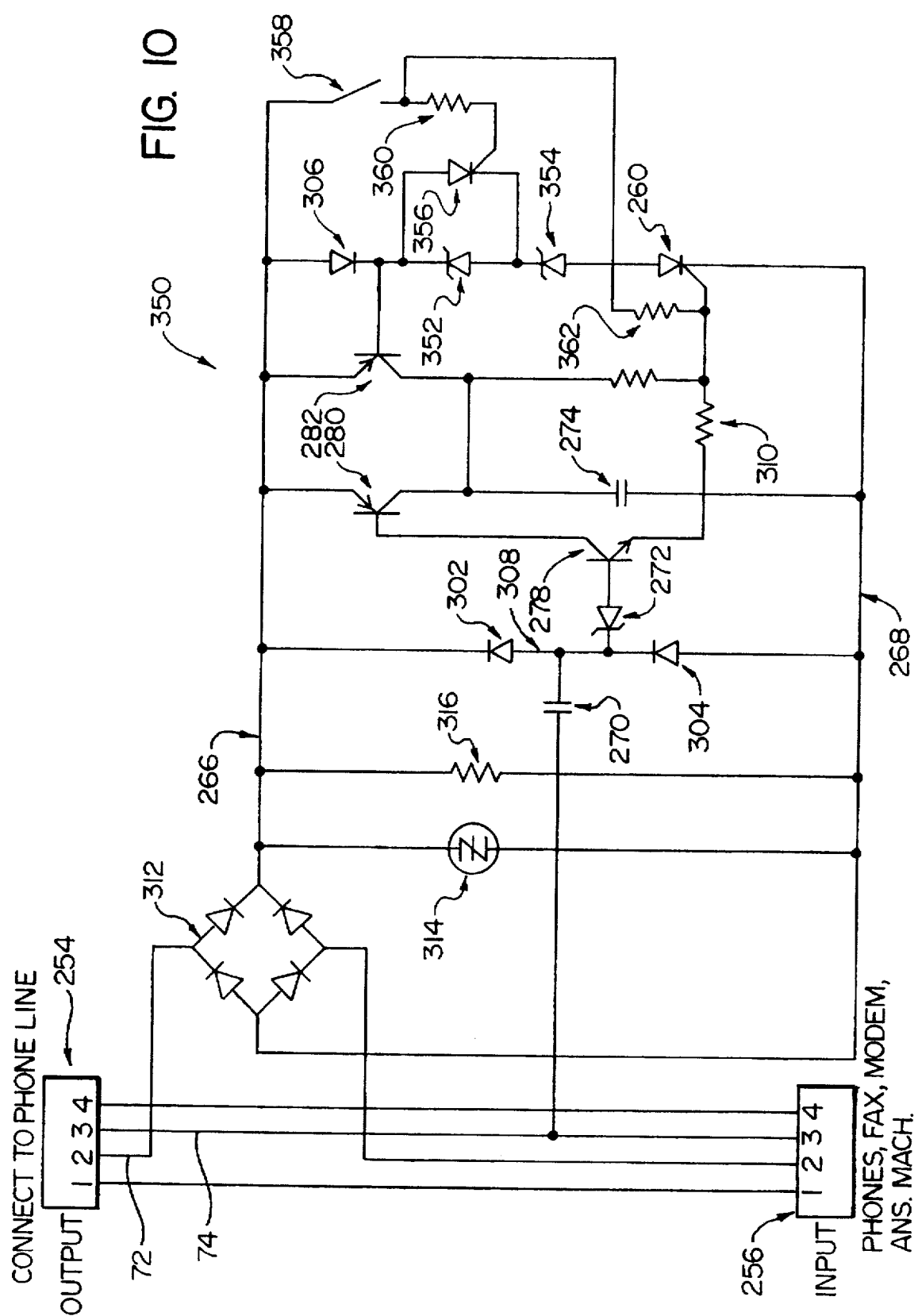
FIG. 10 is a circuit diagram depicting still another lockout circuit of the present invention.

FIG. 7 and 10 and associated descriptions disclose lockout circuits that allow party telephone conversations among users of telephones attached through lockout modules by pressing buttons mounted on these modules.

Figure 12:
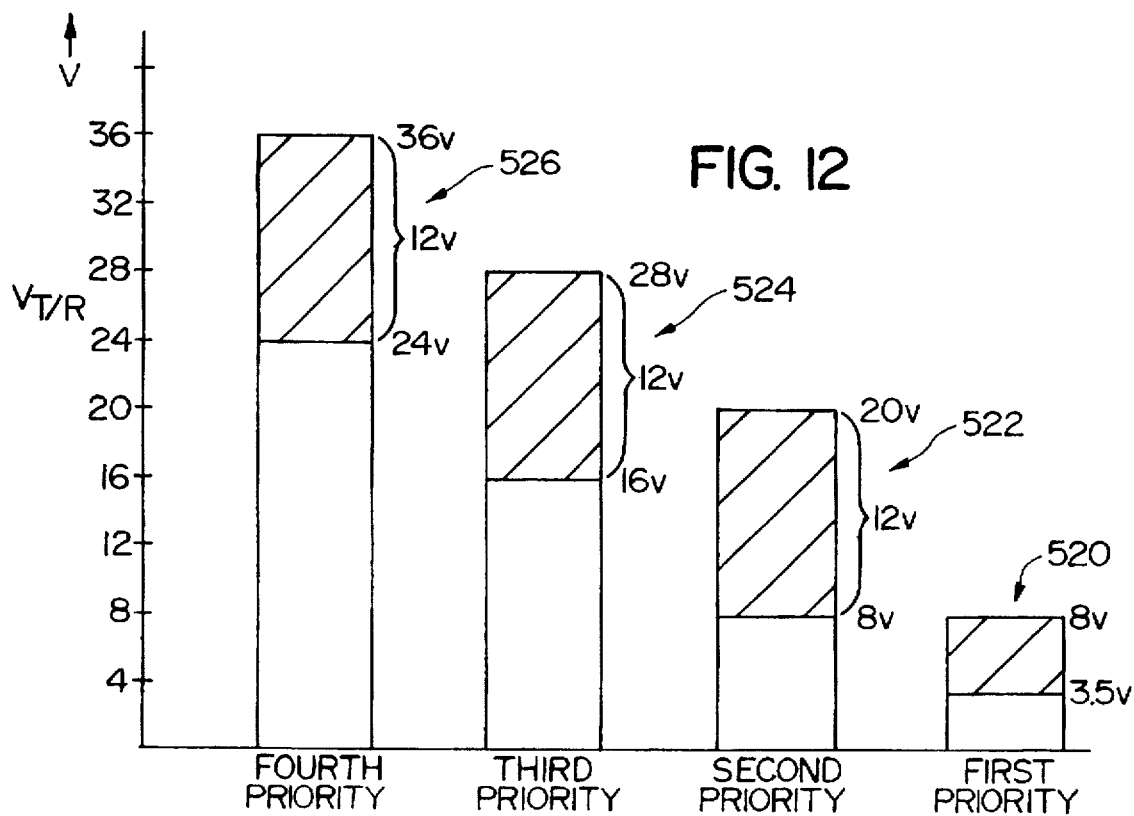
FIG. 12 is a histogram depicting how more than two levels of priority can be obtained by adjusting an offset voltage in the exemplary lockout circuits described above.

FIG. 12 and associated descriptions detail the system level coordination of lockouts to create a multilevel line access priority control system on a single line subscriber telephone system.

Figure 13:
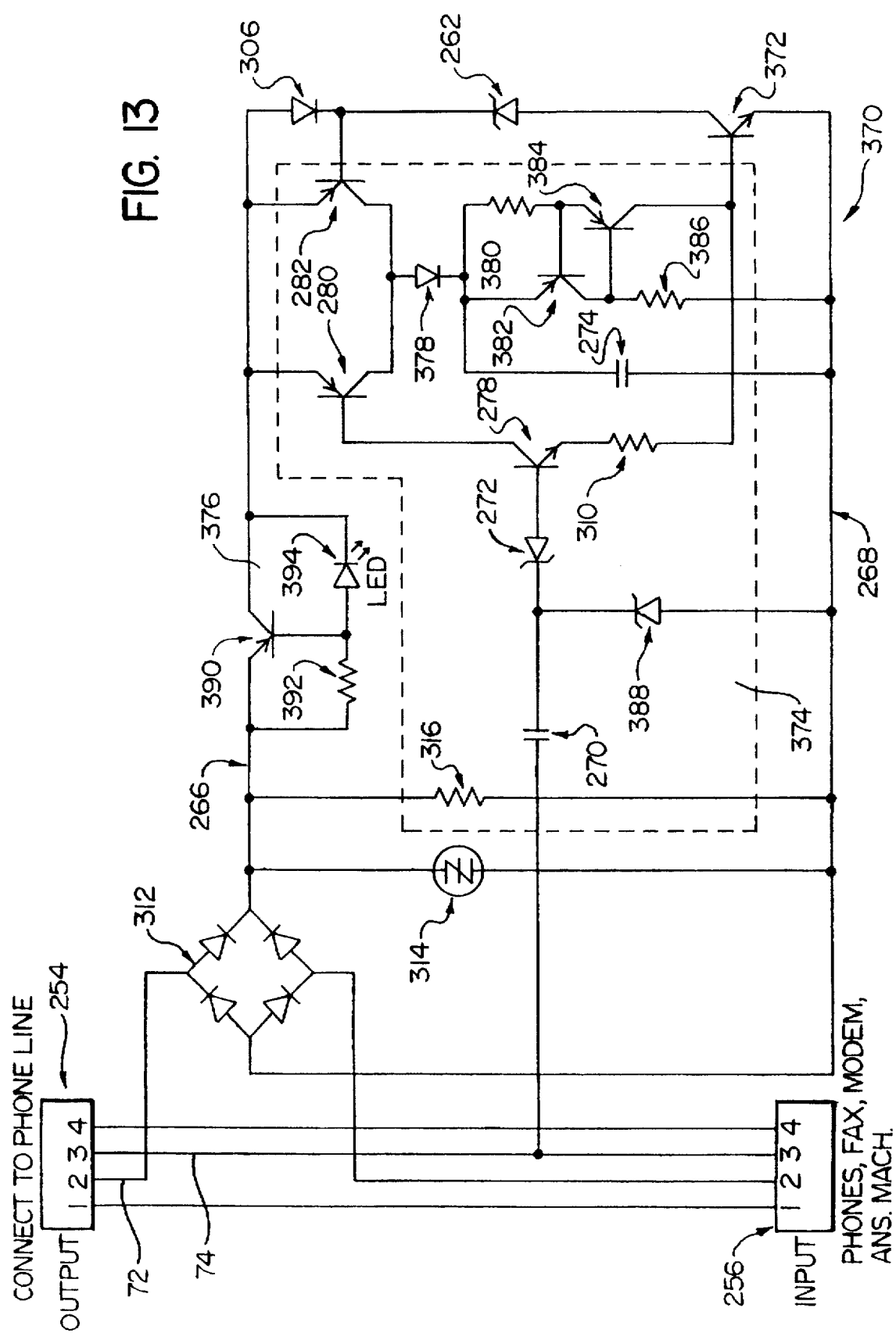
FIGS. 13 and 14 are circuit diagrams depicting additional lockout circuits of the present invention.
Figure 14:
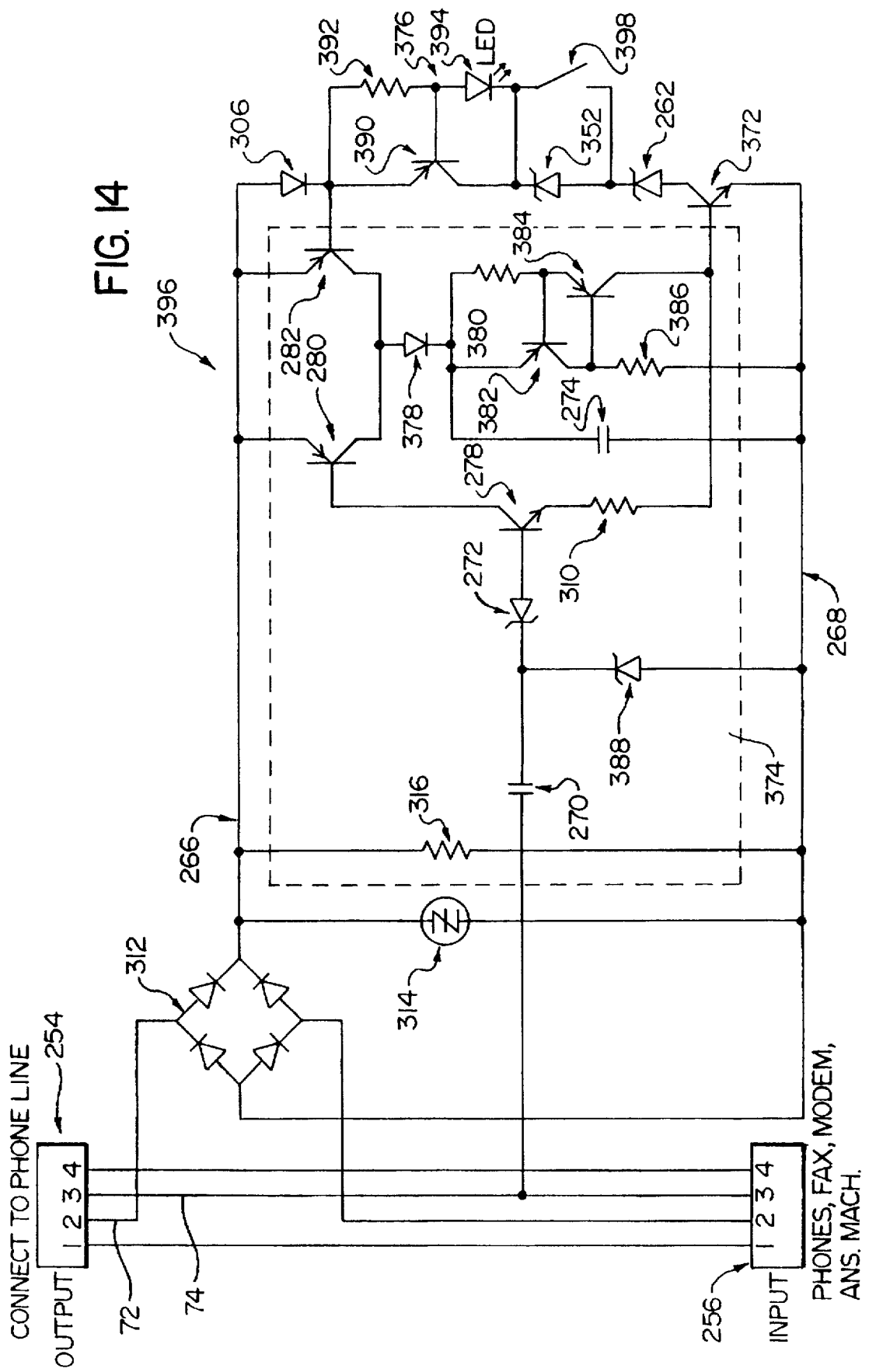

FIGS. 13 and 14 and associated descriptions disclose circuit details for hybrid voltage and current controlled lockout circuits similar to those of FIGS. 8 and 9, but which employs a transistor switch circuit rather than an SCR device and which incorporates an LED to provide an indication of the status of the lockout module.

Figure 11:
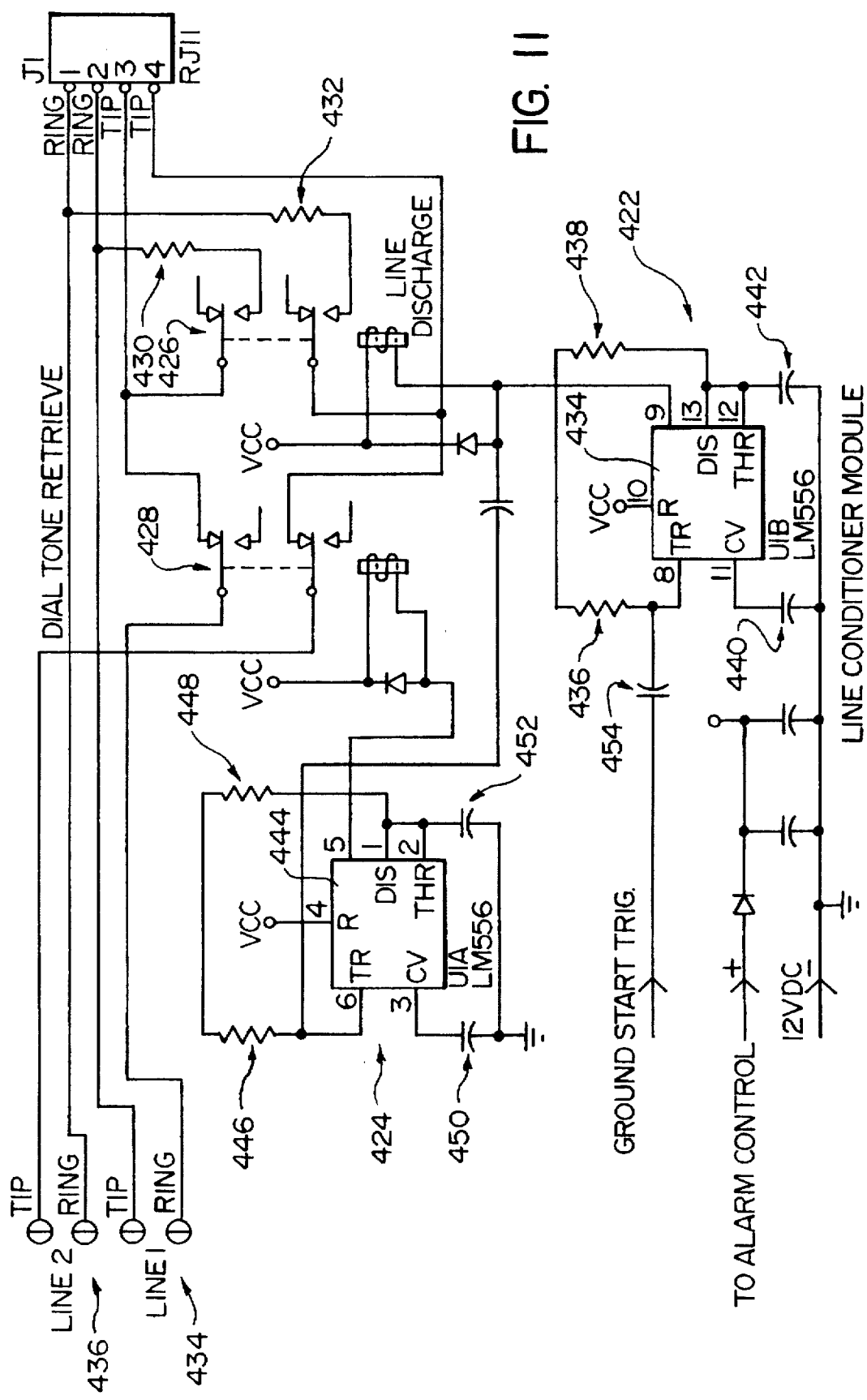
FIG. 11 is a circuit diagram depicting a line conditioning circuit that may be attached to certain security panels that do not have the ability to recover a high and dry line.

FIG. 11 and associated descriptions detail the implementation of a telephone line conditioner that will allow older security systems to gain access to a telephone system equipped with the lockout modules outlined in the forgoing descriptions.

In the following discussion, the construction, operation, and use of each of the various lockout circuits that can be used in the modules 40a and 40b will be described. From this discussion, it will be apparent that the lockout modules 40a and 40b need not be identical; but each of these modules should under most, if not all, circumstances at least be able to disconnect its associated telephone device from the telephone line 24 when the security system is to be given access to the telephone line 24.

It should also be apparent that the lockout circuits need not be physically located in a separate module; these circuits may be included in the telephone device itself, obviating the need for a separate module to be connected between the telephone device and the telephone line. While the mechanical arrangement would be different in this case, installing the lockout circuit in the telephone device would be electrically indistinguishable from installing this circuit in a separate module.

1. First Exemplary Lockout Circuit

Referring now to FIG. 3, depicted therein is a lockout circuit 50 that may be used by one or both of the lockout modules 40a and 40b to disconnect the telephone devices 36 and 38 from the telephone line 24 under the appropriate conditions.

The lockout circuit 50 comprises a mechanical portion 52 including first and second connectors 54 and 56 and an electrical portion 58 including a silicon trigger switch (STS) 60, a Zener diode 62, a switch circuit 64, and a switch control circuit 66.

The connectors 54 and 56 connect the electrical portion 58 between a telephone line and a telephone device. Generally speaking, one or more of the STS 60, Zener diode 62, and switch circuit 64 operating under control of the switch control circuit 66 function to disconnect the telephone device from the telephone line under certain conditions.

As will be discussed in detail below, the use of three devices and/or circuits ensures that the telephone device will be disconnected, and will stay disconnected, when appropriate, and also provides a significant level of fault tolerance.

Identified by reference characters 68 and 70 in FIG. 3 are reference points that will be referred to as the first and second circuit nodes, respectively. If current flows between these circuit nodes 68 and 70, or the voltage across these points is above a predetermined value, the telephone device attached to the circuit 50 has access to the telephone line; if current cannot flow between these points, or the voltage across these points is below a predetermined value, the associated telephone device does not have access to the telephone line.

More specifically, the circuit 50 operates in one of two normal modes. In the first, a current path is established through the STS 60, Zener diode 62, and switch circuit 64 between the first and second circuit nodes 68 and 70. In the second mode, one or more of these components 60, 62, and/or 64 opens to prevent current flow between the nodes 68 and 70 or insufficient voltage is available to the attached phone device to power this device.

To understand the conditions under which the components 60, 62, and/or 64 either conduct or prevent conduction of current between the nodes 68 and 70, it is necessary to understand how telephone devices operate in conjunction with a telephone network. The operation of telephone devices and telephone networks is well-known in the art, but will be reviewed herein briefly to facilitate the readers understanding of the present invention.

As shown in FIG. 2, a conventional telephone line comprises to conductors: a TIP conductor 72 and a RING conductor 74. These conductors 72 and 74 are laid throughout the subscriber's premises 26, and one or more telephone devices are connected thereto. The telephone devices are connected in parallel across the TIP and RING conductors 72 and 74.

In the exemplary circuit 50, when none of the telephone devices attached to a given telephone line are in use, approximately 48 volts is present across the TIP and RING conductors. In this condition, the telephone line is commonly referred to as "on hook". As will be discussed below, certain telephone lines operate off of 24 volts, but such systems are the exception.

When a given telephone device requires access to the telephone line, a switch within the device is closed, causing current to flow through the device. The telephone network detects this current flow and goes from its on hook condition to a condition referred to as "off hook". In the off hook condition with one telephone device attached to the line, the voltage across the TIP and RING conductors drops to approximately 7 volts or less, depending upon the particulars of the telephone device. The telephony signal is carried by the current flowing through the loop formed by the telephone network, telephone line, and telephone devices.

When the telephone line first goes off hook, a dial tone is sent by the telephone network over the line, where it can be detected by the telephone devices connected to the line. These devices can establish a connection with another line through the telephone network by dialing the appropriate number at the dial tone.

Because power for the telephone devices is supplied by the telephone network, the system is set up to disconnect a line that is left off hook and unconnected to another line. In particular, after the dial tone has been present for a predetermined period of time without a connection being established to another telephone line, a message is played, an alarm is sounded to get the subscriber's attention, and the phone line is disconnected. In this condition, the line is commonly referred to as being "high and dry". To recover a high and dry line, the connected phone is simply disconnected for a period of time and then reconnected to obtain a dial tone.

In a conventional situation, with a number of telephone devices directly attached to a single line, more than one telephone device can be connected to the line at a given time. But each additional telephone that is connected to the line causes an additional voltage drop across the TIP and RING conductors and a potential degradation in signal quality.

Given this background discussion, the operation of the lockout circuit 50 should be more easily understood. A careful review of FIGS. 2 and 3 reveals that the lockout circuit 50 is connected in series with the telephone device associated therewith; current must pass in a loop from the TIP conductor 72 through the lockout circuit 50 and its associated telephone device and back to the RING conductor 74.

More specifically, the circuit node 68 is connected by an output conductor 76 and the connector 54 to the TIP conductor 72. The circuit node 70 is connected by an input conductor 78 and the connector 56 to a TIP terminal 80 (FIG. 2) of the telephone device. A RING terminal 82 of the telephone device is connected by a pass-through conductor 84 and the connectors 54 and 56 to the RING conductor 84.

If the STS 60, Zener diode 62, and switch circuit 64 are all conductive, a very low resistance path is created between the TIP conductor 72 and the TIP terminal 80. If any of these components 60, 62, or 64 are nonconductive, current will not flow through between the TIP conductor 72 and TIP terminal 80.

As is well-understood in the art, the STS 60 is a form of thyristor and other properly configured thyristors may be used in its place. The characteristic that defines any part used in the location of the STS 60 is that, if current begins flowing therethrough above its forward breakover voltage, the device will conduct and remain conductive even if the voltage thereacross subsequently falls below the initial forward breakover voltage. But if the voltage across the device falls below its forward breakover voltage before current begins to flow therethrough, the device will be nonconductive.

The STS 60 and any device used in its stead thus operates as a latch circuit that becomes conductive when a first set of conditions are met and remains conductive until a second set of conditions are met. The device 60 will thus also be referred to herein as a latch element or latch means.

The STS 60 of the present invention has a forward breakover voltage of approximately 32 volts. When a telephone device associated with the STS 60 connects to the telephone network, current begins to flow through the STS with approximately 48 volts present across the TIP and RING conductors 72 and 74. With the STS 60 connected as shown in FIGS. 2 and 3, the STS 60 becomes conductive. As the line goes off hook and the voltage across the TIP and RING conductors drops, the STS 60 remains conductive, thereby allowing current to flow between the first and second circuit nodes 68 and 70 and thus through the associated telephone device.

The STS's 60 within the lockout modules 40a and 40b operate together to give, between the telephone devices 36 and 38, priority to the device that first connects to the line 24. In particular, if the telephone device 36 connects to the line 24, the STS 60 of the lockout module 40a becomes and remains conductive. When the device 36 connects, the line 24 goes off-hook and the voltage across the TIP and RING conductors 72 and 74 drops below the forward breakover voltage of the STS 60 within the lockout module 40b; the voltage across the STS in the lockout module 40b is thus too low for it to become conductive if the device 38 attempts to connect to the line 24. Assuming that the security panel 34 does not connect to the line 24, the lockout module 40b remains nonconductive until the line 24 goes back on hook.

Accordingly, any telephone device connected to the line 24 through a lockout module 40 having a STS 60 will not be able to access the line 24 unless it is the first device to do so.

Referring now to the Zener diode 62, an offset voltage is present across this diode 62; the offset voltage is equal to the breakdown voltage of the diode 62 and is connected in series with the telephone device associated therewith. The breakdown voltage of the Zener diode 62 is selected such that, when only one telephone device is connected to the line, the voltage across the connected telephone device is sufficient to power the device. But the offset voltage introduced by the Zener diode 62 is also selected such that, when two telephone devices are connected to the line, the voltage drop across the Zener diode 62 results in insufficient voltage across the telephone device to power that device.

Of course, as the voltage drop across the Zener diode 62 falls below its breakdown voltage, the Zener diode 62 will become nonconductive and thereby disconnect the telephone associated therewith from the line. In this case, it should be kept in mind that telephony signals are carried by current, and the Zener diode 62, via its offset voltage, forces the loop current to zero, thereby shutting off the telephone device.

The Zener diodes 62 in the lockout modules 40 thus function to force the disconnection of a telephone device connected to a line through a lockout module 40 in the event that a telephone device not equipped with a lockout module 40 connects to the line.

The breakdown voltage of the exemplary Zener diode 62 is approximately 10 volts, but can be in the range of approximately 5 to 14 volts and still operate under the principles of the present invention in most situations. In addition to the breakdown voltage of the Zener diode 62, the offset voltage will include the saturation voltages of the STS 60 and switch circuit 64, although the portion of the offset voltage contributed by the Zener diode 62 will normally be much greater than that contributed by the STS 60 and switch circuit 64.

Accordingly, when the line voltage between the TIP and RING conductors 72 and 74 drops to less than 15 volts (such as when a second telephone device is connected directly to the line), a voltage of significantly less than 5 volts exists across the line and any telephone devices connected through a lockout module will effectively be disconnected from the line. Again, current cannot flow to any telephone device connected through a lockout module having a Zener diode with a higher threshold voltage.

The offset Zener diodes 62 in the lockout modules 40 thus function to disconnect non-priority telephone devices (devices connected through a lockout module) when higher priority telephone device (devices not connected through a lockout module) connects to the line. Another purpose of these Zener diodes 62 will become apparent after the following discussion of the switch circuit 64.

Referring now to the switch circuit 64, the control circuit 66 operates this circuit 64 to delay the reconnection of an attached telephone device to a line to allow the security panel 34 to recover a high and dry line.

In particular, the switch control circuit 66 comprises a control Zener diode 84, a control capacitor 86, a control resistor 88, a discharge diode 90, and a discharge resistor 92. The switch circuit 64 can be any three terminal component that, when an appropriate control signal is supplied to a first terminal, allows current to flow from a second to a third terminal. The exemplary lockout circuit 50 uses first and second transistors 94 and 96 configured as a Darlington pair as the switch circuit 64.

The switch circuit 66 and switch control circuit 68 operate as follows. When a voltage is present across the first and second circuit nodes 68 and 70, current will flow through the control resistor 88 and charge the control capacitor 86. When the voltage across the control capacitor 86 exceeds the breakdown voltage of the control Zener diode 84, this diode 84 will become conductive and allow current to flow to the base of the first transistor 94. This biasing current causes the first and second transistors 94 and 96 to turn on, thereby allowing current to flow from the collector to the emitter of the second transistor 96.

When the voltage across the first and second circuit nodes 68 and 70 drops, the control capacitor 86 discharges through the discharge diode 90 and discharge resistor 92. When the voltage across the control capacitor 86 drops below the breakdown voltage of the control Zener diode 84, the diode 84 becomes nonconductive and ceases supplying a biasing current to the transistors 94 and 96. This turns off the transistors 94 and 96, and current is no longer able to flow through the second transistor 96 between the circuit nodes 68 and 70.

In the exemplary circuit 50, the breakdown voltage of the control Zener diode 84 is substantially the same as that of the offset Zener diode 62 (although they do not have to be exactly the same). The second transistor 96 is thus controlled to become conductive under the same voltage conditions as the Zener diode 62.

The control capacitor 86 and control resistor 88 introduce a delay that causes the second transistor to become conductive a predetermined time period after an appropriate voltage appears between the circuit nodes 68 and 70. This predetermined time period is set by the RC circuit formed by the capacitor 86 and resistor 88 and is approximately 3 seconds in the exemplary circuit 50. The offset Zener diode 62, in addition to disconnecting a telephone device from a telephone line as described above, prevents the control circuit 66 from oscillating between its two states.

The purpose of the delay introduced by the control circuit 66 is to allow the security panel 34 to obtain access to a high and dry line. For example, if the telephone device 36 is a conventional telephone and its receiver has been inadvertently removed from its cradle, the telephone network 22 will eventually place the line 24 in its high and dry mode as discussed above.

Now assume that the security panel 34 requires access to the line 24. If the switch circuit 64 and switch control circuit 66 are not provided, the security panel 34 can connect itself to the line and, due to the offset voltage across the Zener diode 62 within the lockout module 40a, disconnect the telephone device 36 from the line 24.

The line 24 remains high and dry, however, so it is necessary for the security panel 34 to disconnect from the line for a period of time and then reconnect after the line has been placed in its on hook condition. But remember that the telephone device 36 is still connected (the receiver is still off of its cradle), so as soon as the security panel 34 disconnects from the line, the STS 60 in the lockout module 40 becomes conductive again, reconnecting the telephone device 36 to the line 24. Because the telephone device 36 has been immediately reconnected to the line 24, insufficient time passes for the telephone network to recognize that the line should be taken out of high and dry mode. The line 24 thus remains in high and dry mode.

The delay introduced by the switch control circuit 66 allows the telephone device to be disconnected for a period of time sufficient for the security panel 34 to take the steps necessary to signal to the telephone network 22 that the line 24 should be taken out of high and dry mode and back into its off hook condition.

More specifically, when line 24 is in high and dry mode and the security panel 34 connects thereto, the voltage across the TIP and RING conductors 72 and 74 drops and causes the control capacitor 86 in the telephone device 36 to discharge. This results in the Zener diode 84 becoming nonconductive, thereby opening the switch circuit 64 and disconnecting the telephone device 36.

When the security panel 34 subsequently disconnects to signal to the telephone network that the line 24 should be taken out of high and dry mode, the higher voltage across the TIP and RING conductors 72 and 74 begins to charge the control capacitor 86. But the time constant set by the control capacitor 86 and control resistor 88 delays the point in time at which the voltage across the control capacitor 86 exceeds the breakdown voltage of the control Zener diode 84. This time constant is predetermined such that the voltage across the control capacitor 86 does not reach the breakdown voltage of the Zener diode 84 until after the security panel 34 has had a chance to disconnect from the line 24 for a period of time sufficient for the network to place line back in its on hook condition. At that point, the security panel 34 reconnects to the line and drops the voltage across circuit nodes 68 and 70 to below the level required to disconnect the telephone device 36 from the line 24. A telephone device will not be able to reconnect to the line 24 as long as the security panel 34 is connected thereto.

If no one physically places the receiver of the device 36 back in its cradle, the line may eventually go back into high and dry mode after the security panel disconnects, but the security panel will have already transmitted its data and can do so again if necessary.

It should be noted that the lockout circuit 50 depicted in FIG. 3 will always delay by a predetermined period (3 seconds in this example) the time at which the telephone connected thereto can connect to the line. This reduces the "transparency" of the lockout circuit 50 in that this delay may be noticeable to the user. Other exemplary lockout circuits described below perform the same basic function as the circuit 50 but do not introduce this delay.

Referring now to FIG. 4, depicted therein is a timing diagram showing the voltage $V_{T/R}$ across TIP and RING conductors 72 and 74 for one exemplary situation in which the present invention will be used. In FIG. 4, a capital "T" indicates a time period, and a lower case "t" indicates a point in time. Identified by reference characters $V_1$, $V_2$, $V_3$, and $V_4$, respectively, are the forward breakover voltage of the STS's 60, the voltage drop across offset Zener diode 62 in the lockout module 40a, the voltage drop across the telephone device 36, and the voltage drop across the security panel 34.

During time period $T_1$, the line 24 is in its on hook state and neither the telephone devices 36 and 36 nor the security panel 34 has access to the line 24. We will also assume that the security panel 34 has not recently had access to the line 24. The voltage $V_{T/R}$ is approximately 48 volts when the line 24 is in its on hook state.

At time $t_2$, the telephone device 36 connects to the line 24, and the voltage $V_{T/R}$ drops to approximately 18 volts. The telephone device 36 is in use during the time period $T_2$. During this time period, the voltage $V_{T/R}$ is below the forward breakover voltage $V_1$ of the STS 60 of the lockout module 40b; the module 40b thereby disconnects the telephone device 38 from the line 24.

At time $t_{n+1}$, the security panel 34 connects to the line 24 and begins to drop the voltage $V_{T/R}$. As the voltage $V_{T/R}$ falls, the voltage offset introduced by the offset Zener diode 62 will collapse the voltage across the telephone device 36, and the device 36 will disconnect from the line when the this voltage $V_3$ and corresponding device loop current are below that required for operation of the device 36.

Eventually, the voltage $V_{T/R}$ falls to approximately 5-7 volts and stays at this level during the time period $T_3$. As indicated, the entire voltage dropped between the TIP and RING conductors is across the security panel 34 connected to the line 24. During the time period $T_3$, the voltage $V_{T/R}$ is less than the breakdown voltage of the offset Zener diodes 62 in the lockout modules 40a and 40b; the Zener diodes 62 cease conducting when the voltage thereacross falls below their breakdown voltage, which causes the diodes 62 and switch circuit 64 to become nonconductive and disconnect the telephone devices 36 and 38 from the line 24 during this period $T_3$.

When the voltage $V_{T/R}$ falls below the breakdown voltage of the control Zener diodes 84, the control capacitor 86 immediately discharges, which causes the Zener diodes 84 to stop supplying a biasing current to the switch circuit 64. The switch circuit 64 thus opens. At this point, the STS 60, offset Zener diode 62, and switch circuit 66 are all open, securely disconnecting the telephone devices 36 and 38 from the telephone line 24.

To establish a new connection with the telephone network. the security panel 34 disconnects from the line 24 during the time period $T_4$. The delay introduced by the switch control circuits 66 is longer than the time period $T_4$, which keeps the control Zener diodes nonconductive and prevents the telephone devices 36 and 38 from reconnecting to the line 24 during this period $T_4$.

At time $t_{n+4}$, the security panel 34 reestablishes its connection to the line 24, and, during the time period $T_5$, the security panel 34 dials the number of the security office 30 and transfers any data indicative of security conditions at the subscriber's premises over the telephone network 22. During this time period $T_5$, the voltage $V_{T/R}$ is less than the forward breakover voltage $V_1$ of the STS's 60 and the breakdown voltages of the Zener diodes 62 and 84; the STS's 60, Zener diodes 62, and switching circuits 64 are all still nonconductive during the time period $T_5$.

At time $t_{x+1}$, the security panel 34 disconnects from the line 24 and the line 24 goes on hook. During the time period $T_6$, the control capacitors 86 charge until, at time $t_{x+3}$, the voltage across these capacitors 86 reaches the breakdown voltage of the control Zener diodes 84, causing these diodes 84 to conduct and close the switch circuits 64. The telephone devices 36 and 38 thus again have access to the line 24 during the time period $T_7$.

With an understanding of the operation of the lockout circuit 50, certain benefits of this circuit should become apparent, and these benefits will now be discussed.

Initially, the lockout circuit 50 is powered by the telephone line and does not require a separate power source that may fail or become discharged. Yet the circuit 50 is energized only when the telephone associated therewith is connected to the line. The circuit 50 thus is not a load that must be continuously driven by the telephone network 22. This is very significant when one considers the cumulative load that would be carried by the network 22 if it was required continuously to power large numbers of lockout modules.

Another significant benefit of the present invention is its simplicity. The lockout modules must be inexpensively mass produced if it is to be practical to install one on every telephone in premises containing a security system. The lockout circuit of the present invention comprises very few inexpensive parts and can be easily and inexpensively manufactured. And the fewer parts included, the less the chance that one of the parts will be defective or will be damaged after it has been installed.

The lockout circuit 50 is compatible with most existing telephone networks, telephone devices, and security systems; the circuit 50 is not compatible with pulse dialing and other telephone network pulse functions. Discussed below is a slightly more complicated circuit that is completely compatible with the existing telephony infrastructure.

The lockout modules may be installed easily and quickly by non-technicians. They are simply plugged into the conventional telephone lines using conventional telephone jacks.

The present invention also greatly decreases the complexity of installing a security panel. The security panel can be simply plugged into any telephone outlet. This process is thus one that can, in many situations, be accomplished by a non-technician. It may thus be possible for one person to both sell a security system and install this system at the same time.

The lockout circuit 50 is simple in construction and operation but operates in a very fault tolerant manner. The worst case fault scenario for the system 20 is that one of the lockout modules fails in a manner that prevents the security system 32 from obtaining access to the line 24 when a security condition is detected. The odds are very much against this scenario occurring with the lockout module of the present invention.

In particular, the lockout circuit 50 contains four components that are subject to such a failure: the STS 60, the Zener diode 62, the switch circuit 64, and the switch control circuit 66. If the STS 60, Zener diode 62, switch circuit 64, and/or switch control circuit 66 fail, the STS 60, Zener diode 62, and switch circuit 64 can be in either an open state or a shorted state.

A failure of any one of these components such that the STS 60, Zener diode 62, or switch circuit 66 is in the open state is tolerable because such a failure will simply cause the telephone device attached thereto to be unable to connect to the line. This failure will be apparent as soon as the device attempts to access the line and can be remedied by simply replacing the failed lockout module. When this type of failure occurs, the security system 32 is not prevented from accessing the line 24.

If a failure occurs such that any two of the STS 60, Zener diode 62, or switch circuit 64 fails to a short, the lockout circuit 50 will allow the security panel to obtain control of the line. The only situation in which the lockout circuit 50 will fail to the worst case failure scenario is if all three of the STS 60, Zener diode 62, and switch circuit 64 fail to a shorted condition. While possible, the odds are greatly against this failure occurring.

2. Second Exemplary Lockout Circuit

Referring now to FIG. 5, depicted therein is another exemplary lockout circuit 120 that may be used in the lockout modules 40. This circuit 120 operates in the same basic manner as the circuit 50 described above; components of the circuit 120 that are the same as the components of the circuit 50 will be assigned the same reference character and will not be discussed again in detail.

The circuit 120 performs the same functions as the circuit 50 but in addition is non-polarized and has transient protection and, optionally, may be provided with noise filtering components and limited voice pass through.

In particular, the circuit 120 comprises a diode bridge 122 connected between the first and second circuit nodes 68 and 70 and the output and input conductors 76 and 78. The diode bridge 122 comprises first, second, third, and fourth diodes 126, 128, 130, and 132. The first and second diodes 126 and 128 are connected at a first bridge node 134, the second and third diodes 128 and 130 are connected at a second bridge node 136, the third and fourth diodes 130 and 132 are connected at a third bridge node 138, and the fourth and first diodes 132 and 126 are connected at a fourth bridge node 140.

The first and second circuit nodes 68 and 70 are connected to the second and fourth bridge nodes 136 and 140, and the output and input conductors 76 and 78 are connected to the first and third bridge nodes 132 and 138, respectively.

This arrangement allows current to flow only in one direction through the circuit portion 58 and thus allows the connectors 54 and 56 to be reversed. This in turn allows the same, standard connector assembly to be used to attach the circuit 120 to the telephone line 24 as is used to attach the circuit 120 to the telephone devices 36 and 38. And because the circuit 120 is non-polarized, it does not matter which connector 54 or 56 is attached to the telephone line 24 and which is attached to telephone device 36 or 38. This feature simplifies manufacturing and installation of the lockout modules using the lockout circuit 120.

A spark gap 142 may be connected between the output and input connectors 76 and 78 and a STS 144 is connected between the first and second circuit nodes 68 and 70 to provide transient or surge protection to the circuit portion 58. The spark gap 142 is optional and need not be provided to obtain a commercially viable lockout module.

A coupling capacitor 146 may be connected between the circuit nodes 68 and 70 to pass through an audio signal carried on the telephone line at a severely reduced level. This allows a person on a given one of the telephone devices 36 or 38 to determine that a signal is present on the line 24 even if the given telephone device is disconnected by the circuit 120 but does not allow that person to understand or participate in any conversations carried by the signal. This coupling capacitor 146 is optional and need not be included in a commercial embodiment of the lockout circuit 120.

A filtering capacitor 148 may be connected across the control Zener diode 84 to filter out noise generated by the switching circuit 64.

3. Third Exemplary Lockout Circuit

Referring now to FIG. 6, depicted therein is yet another lockout circuit 220 that may be used in the lockout modules 40. The circuit 220 is a simplified version of the circuit 50 described above that is non-polarized and transient protected but does not guarantee that the security panel 34 will be able to obtain control of the local telephone line 24 if the line is in high and dry mode. Again, the reference characters used in connection with the lockout circuit 50 described above may be used to identify similar components in the circuit 220.

The lockout circuit 220 comprises a STS 222, a first Zener diode 224, a second Zener diode 226 connected in series across first and second circuit nodes 228 and 230. The STS 222 functions in exactly the same manner as the STS 60 described above.

The two Zener diodes 224 and 226 are connected such that they function in exactly the same manner as the offset Zener diode 62 above, but two are employed to render the circuit 220 non-polarized. The total breakdown voltage of the two Zener diodes 224 and 226 should be determined in the same manner as that of the Zener diode 62.

The circuit 220 does not contain circuitry that performs the function of the switch circuit 64 and switch control circuit 66 described above; accordingly, the circuit 220 does not delay when reconnecting the telephone device 36 or 38 connected thereto to the telephone line 24. This creates the possibility that, if the attached telephone device is left in the connected mode (e.g., receiver off of the cradle), the security panel 34 will not be able to take control of the telephone line 24. The circuit 220 is thus best suited for telephone devices where there is little possibility that device will be responsible for a high and dry condition.

The lockout circuit 220 further comprises a STS 232 and, optionally, a spark gap 234 for transient protection.

4. Fourth Exemplary Lockout Circuit

Referring now FIG. 8, and depicted therein is a yet another lockout circuit 250 that may be used by one or both of the lockout modules 40a and 40b to disconnect the telephone devices 36 and 38 from the telephone line 24 under the appropriate conditions. This class of lockout circuit performs all of the basic telephone lockout functions of those described for FIGS. 3, 4 and 5.

The fundamental techniques of utilizing a latching device to selectively switch the telephone device onto the telephone line and a voltage offsetting device, or Zener diode, to cut off the loop current through a lower priority telephone device are common between the lockout circuits 50 and 250.

Additionally, the circuit 250 eliminates the need for a reconnection delay, such as that provided by the control circuit 66 of FIG. 3; all line connections in progress are disconnected for as long as the security system attempts to dial out.

The circuit 250 also provides enhanced compatibility with pulse-dialing telephone equipment and telephone network fault interrogation functions. By way of background, older telephone systems and equipment implement telephone number signaling to the central office switch using a series of pulses that interrupt the telephone line loop current on a periodic basis. This is commonly known in the trade as pulse-dialing. Short interruptions in telephone line loop current are also implemented by the telephone network to identify and isolate malfunctioning telephone equipment. these interruptions typically occur within the first few milliseconds the telephone goes off-hook.

The lockout circuit 250 comprises a mechanical portion 252 including first and second connectors 254 and 256 and an electrical portion 258 including an SCR 260, a Zener diode 262, and a switch control circuit 264. The mechanical portion operates in the same manner as the mechanical portion 52 described above and will not be described herein in detail. Identified by reference characters 266, 268, and 269 in FIG. 8 are first, second, and intermediate circuit nodes, respectively.

The electrical portion 258 obtains the same basic functions as the electrical portion 58 of the circuit 50 described above, but does so in a slightly different manner.

In particular, the Zener diode 262 performs the same function as the Zener diode 62 described above and will not be described herein in detail. But the SCR 260, under control of the switch control circuit 264, performs the functions of both the STS 60 (preventing subsequent non-priority telephone devices from connecting to the line) and the switch circuit 64 (allowing recovery of a high and dry line). As will be seen from the following discussion, combining these functions also allows the circuit 250 to be designed to accommodate pulse dialing devices and telephone network pulsing functions.

The switch control circuit 264 comprises a trigger capacitor 270, a Zener diode 272, a holding capacitor 274, a resistor 276, and first, second, and third transistors 278, 280, and 282. The transistors 280 and 282 are connected in parallel with their emitters connected to the circuit node 266 and their collectors connected to the intermediate circuit node 269. The holding capacitor 274 is connected between the intermediate node 269 and the second circuit node 268.

The base of the transistor 280 is connected to the collector of the transistor 278. The emitter of the transistor 278 is connected to the gate of the SCR 260. The transistor 276 is connected between the intermediate node 269 and the gate of the SCR 260.

The Zener diode 262 is connected between the base of the transistor 282 and the anode of SCR 260. The cathode of the SCR 260 is connected to the circuit node 268.

The base of the transistor 280 is connected to the collector of the transistor 278. The trigger capacitor 270 is connected to the RING conductor 74, and the Zener diode 272 is connected between the trigger capacitor 270 and the base of the transistor 278.

The control circuit 264 operates basically as follows.

As mentioned above, the Zener diode 262 functions in exactly the same manner as the Zener diode 62 described above to allow a priority telephone device to disconnect a non-priority device connected through the circuit 250.

The gate control circuit 264 controls the SCR to prevent or allow current flow between the nodes 266 and 268 under appropriate conditions. In particular, the control circuit 264 initiates and maintains gate current to the SCR 260 under two successive conditions. When these two conditions occur in order, the SCR 260 will connect a telephone device associated with the circuit 250 to a telephone line. Periodic reference to the timing diagram of FIG. 4 will aid the reader in understanding the operation of the circuit 250.

In the first condition, the line tip to ring voltage is greater than the breakdown voltage of the Zener diode 272; this condition occurs if the line 24 is unused or a call is in progress through a lower priority lockout device (e.g., time period T, of FIG. 4).

During this period, the trigger capacitor 270 charges via its connection to the RING conductor and leakage current through Zener diode 272 and transistors 278 and 280 such that the voltage across this capacitor 270 is equal to the line voltage (e.g. 48 volts). It should be noted that, practically speaking, no current is drawn by the circuit 250 in this state; the circuit 250 is thus not continuously powered during this first condition.

But the trigger capacitor 270 is armed with a suitable trigging voltage that can be amplified by transistors 278 and 280 to simultaneously inject gate current into the SCR 260 and charge the holding capacitor 274 when the associated telephone device connects to the telephone line.

The second condition occurs when the telephone device attached to the circuit 250 connects to the line. At this point, lockout circuit 250 is placed in series with the telephone voice circuit across the TIP and RING conductors 72 and 74 (e.g., at time $t_2$ of FIG. 4).

This condition injects a small portion of the stored charge in the trigger capacitor 270 into the base of transistor 278 via the Zener diode 272. If the voltage stored by the trigger capacitor 270 is greater than the breakdown voltage of the Zener diode 272, the amplified base current of transistor 278 is conducted into the gate of the SCR 260 through the transistor 280. The gate current of the SCR 260 latches the SCR on, and the follow-on gate current provided by the holding capacitor 274 via transistor 280 ensures that the SCR remains latched while the telephone device and lockout unit stabilize.

If the voltage stored on the trigger capacitor 270 is not greater that the Zener breakdown voltage of Zener diode 272, the SCR 260 will not latch on and will thus deny the connected telephone device access to the line.

Once the SCR 260 conducts current through to the telephone device via the Zener diode 262 and the base of the transistor 282, a charge equivalent to the break down voltage of the Zener diode 262 is maintained on holding capacitor 274 via the collector of the transistor 282. This ensures that the SCR will remain triggered during any telephone network induced line interruptions.

In the subsequent event that the security system or a higher priority telephone device connects to the line, the voltage at the node 266 will fall downward toward that of node 268. The voltage at the node 268 remains at or near the voltage present at the ring conductor 74 because the attached telephone is off-hook (e.g., at time $t_{n+1}$ of FIG. 4).

The potential between the nodes 266 and 268 is less than the breakdown voltage of the Zener diode 262, so this diode 262 will prevent loop current from reaching the attached telephone device. This in turn allows the holding capacitor 274 to discharge and unlatch the SCR 260, effectively disconnecting the telephone device from the line.

When the security system dialer releases the line to reestablish dial tone, the voltage at the circuit node 266 will rise to full line voltage (e.g., at time $t_{n+3}$ of FIG. 4). The SCR 260 cannot re-trigger, however, because, in the sequence, described above, the trigger capacitor 270 has discharged, and insufficient time has passed to allow the voltage across the capacitor 270 to exceed the breakdown voltage of the Zener diode 272.

Thus, the security system dialer has unrestricted access to the telephone line when it goes back off-hook (e.g., at time $t_{n+4}$ of FIG. 4). The telephone device must be disconnected (if this has not yet been done) and then reconnected to recapture the line at some time after time $t_{x+1}$ of FIG. 4.

Thus, the exemplary lockout circuit 250 provides all of the functional benefits of lockout circuit 50 and overcomes any potential telephone network and telephone equipment compatibility issues associated with anticipated time delays and loop current interruptions. The circuit 250 also does not delay connection of a telephone device to the line when the line is in its on hook condition and thus operates relatively transparently.

5. Fifth Exemplary Lockout Circuit

Referring now to FIG. 9, depicted therein is another exemplary lockout circuit 300 that combines circuit 250 with the line polarity correction and over voltage protection of circuit 120 of FIG. 5. Components of the circuit 300 that are the same as those of the circuit 250 will be assigned the same reference character and not discussed again in detail.

In addition to the components of the circuit 250, the circuit 300 comprises a first, second, and third diodes 302, 304, and 306, a circuit node identified by reference character 308, a resistor 310, a diode bridge 312, and STS 314, and a resistor 316. The diode bridge 312 provide the same functionality as the bridge 122 described above with reference to FIG. 5, and the STS 314 provides the functionality of the STS 144 described above; these components 312 and 314 will be described again below only to the extent necessary for a complete understanding of the present invention.

During conditions were SCR 260 and Zener diode 262 are not conducting, the current resistor 316 ensures that the voltage potential between circuit nodes 268 and 270 remains low. Extraneous noise sources such as AC utility mains or RF broadcast signals coupled to the line elsewhere in the telephone network are rectified by the bridge circuit 312, which in turn establishes an artificial trigger potential on the trigger capacitor 270. Without resistor 316 this voltage might become sufficient to prevent the security system from seizing the line and locking out the attached telephone device.

Protection diodes 302 and 304 are provided to prevent damage to the base circuit of transistor 278 in the event of a line surge condition. These diodes will clamp the circuit node 308 to either circuit node 268 or 270 in the event of voltage surge of either polarity between the TIP and RING conductors.

Further, the resistor 310 increases the base input impedance of the transistor 278; this allows the use of a smaller trigger capacitor 270. A lower capacitance reduces surge induced stress in the components and affords the use of a correspondingly inexpensive capacitor with a voltage rating suitable to withstand established TIP and RING surge voltage conditions.

Protection diode 306 serves to shunt potentially damaging surge currents around the base circuit of transistor 282. This diode is rated to withstand the peak surge currents with a lower forward voltage drop than maximum allowable base to emitter saturation voltage of transistor 282.

6. Sixth Exemplary Lockout Circuit

Referring now to FIG. 7, depicted therein is yet another lockout circuit 320 that may be used in the lockout modules 40. This circuit 320 operates in the same basic manner as the circuits 50 and 120 described above; components of the circuit 320 that are the same as the components of the circuits 50 and 120 will be assigned the same reference character and will be discussed below only if necessary for an understanding of the operation of the circuit 320.

The circuit 320 is identical to the circuit 120 but in addition contains a bypass circuit 322 that allows a user to bypass the protection provided by the STS 60, Zener diode 62, and switch circuit 64.

In particular, the bypass circuit 322 comprise a momentary button 324, a first resister 326, a second resistor 328, a capacitor 330, and an SCR 332. When the button 324 is depressed, current flows through the resistors 326 and 328. These resistors form a voltage divider circuit, and the voltage across the second resistor 328 is applied to the control terminal of the triac 332. This voltage causes the SCR to conduct, allowing current to flow from the first circuit node 68 to the second circuit node 70 regardless of the status of the STS 60, Zener diode 62, and switch circuit 64.

The bypass circuit 322 thus allows a user to push the button 324 and obtain access to the telephone line 24. This user 324 will push the button if the user wants to prevent another device such as the security panel 34 from taking the line 24 or to join in a conversation with another person on the line 24.

For example, if the telephone devices 36 and 38 are both telephones and both parties want to speak on the line 24 in the same conversation, each of the lockout modules 40a and 40b must include the lockout circuit 320 having the push button 324. Then, both parties will depress the buttons 324 and be given simultaneous access to the line 24; this access cannot be interrupted by the security panel 34.

When the telephone line goes back on hook, the triac 332 turns off and the user must push the button 324 again to defeat the protection provided by the components 60, 62, and 64. The bypass circuit 322 thus resets itself each time the line 24 goes on hook.

The exemplary bypass circuit 322 is controlled by the momentary button 324, but any one of a number of devices can be used to trigger the circuit 322. For example, a circuit may be provided that performs the same function as the momentary button 324 in response to a particular tone or pattern of tones generated by the telephone device. Such a circuit may be programmed to perform the bypass function when the "star" or "pound" buttons on a telephone device are pushed; this allows implementation of the bypass function without the need for a momentary button on the lockout module.

7. Seventh Exemplary Lockout Circuit

Referring now to FIG. 10, depicted therein is another exemplary lockout circuit 350 that provides the circuit 300 described above with functionality similar to that of the circuit 320 (e.g., means for manually overriding line priorities of the system in which the circuit 350 is used). This ability is desirable when a second party on a given line needs to participate in a party conversation of three or more people.

The lockout circuit 350 operates in the same basic manner as the circuits 250 and 300 described above; components of the circuit 320 that are the same as the components of the circuits 250 and 300 will be assigned the same reference character and will be discussed below only to the extent necessary for a complete understanding of the operation of the circuit 350.

In the exemplary circuit 350, the implementation of the manual priority override function does not impair the ability of a highest priority telephone device, usually a security system, to interrupt a line connection already in progress.

Additionally, this circuit 350 may be used with other similar circuits to create a system having three levels of priority. The first, highest, level of priority is obtained by connecting a telephone device directly to the telephone line. The second, medium, level priority is obtained by connecting a telephone device through a lockout circuit having only one Zener diode, while the third, lowest, level of priority is obtained by connecting a telephone device through a lockout circuit having two Zener diodes.

The lockout circuit 350 is able to disconnect the attached telephone device (relatively lower priority level) when the security system (relatively higher priority level) connects to the line. But it can be adapted to either maintain or disrupt a connection to the line when a telephone device of a lower level of priority attempts to connect to the line.

These features are achieved through two measures: one is to retrigger the SCR 260 in the lockout module of a relatively lower priority level device and the other is to split the offset voltage function of Zener diode 262 between to separate diodes.

In particular, the lockout circuit 350 comprises the following components in addition to or in place of those of the circuits 250 and 300: Zener diodes 352 and 354, an SCR 356, momentary switch 358, and resistors 360 and 362. The cathode of the diode 352 is connected to the base of the transistor 282, and the cathode of the diode 354 is connected to the anode of the diode 352. The anode of the diode 354 is connected to the anode of the SCR 260.

The SCR 356 is connected in parallel with the diode 352, with the anode of the SCR 356 connected to the cathode of the diode 352. One terminal of the switch 358 is connected to the first circuit node 266, and the other terminal of the switch 358 is connected to the resistors 360 and 362. The resistor 360 is in turn connected to the gate of the SCR 356, while the resistor 362 is connected to the gate of the SCR 260.

The Zener diode 354 establishes the offset voltage associated with a level two priority lockout device and would be used in all lockout devices of all priority levels. The Zener diode 352 is optionally added to the lockout circuit to create a third priority level.

A lockout circuit 350 with only the Zener diode 354 will thus be referred to as a second priority lockout circuit, and a lockout circuit 350 with both Zener diodes 352 and 354 will be referred to as a third priority lockout circuit. A switch may be provided on a lockout module incorporating the circuit 350 such that current flowing between the circuit nodes 266 and 268 through the Zener diode 354 bypasses the Zener diode 352. Such a switch would have the effect of allowing the circuit 350 to be switched between a second priority circuit and a third priority circuit as the user requires.

The actual manual priority override is then achieved on a third or lower priority level lockout circuit by shunting the Zener diode 352 with the SCR 356. This SCR 356 is manually triggered by the switch 358, which momentarily supplies gate current to the SCR 356 via the resistor 360. And when the switch 358 is closed, the resistor 362 simultaneously supplies gate current to the SCR 260 to reestablish the telephone line loop connection for the attached telephone device.

Second priority level lockout devices do not require the SCR 356; the attached telephone device is connected to the line by supplying gate current to SCR 260 using switch 358 through the resistor 362.

Thus, the circuit 350 contains manual priority override function that allows a plurality of telephone devices, each connected through a lockout circuit of second or lower level, to be connected to the line at the same time. In the event that a first priority level device requires access to the line, all the activated lockout circuits will disconnect their respective telephones devices, allowing unrestricted access to the line by the highest level device.

One of ordinary skill in the art will understand that the manual priority override circuit methodology described in connection with FIG. 10 can be applied, with perhaps minor modifications, to one or more of the previously described lockout circuit embodiments.

8. Eighth Exemplary Lockout Circuit

Referring now to FIG. 13, depicted therein is yet another exemplary lockout circuit 370 constructed in accordance with, and embodying, the principles of the present invention. This lockout circuit 370 operates in the same basic manner as the lockout circuits 250 and 300 described above. To the extent that components of the circuit 370 are common with those of the circuits 250 and/or 300, the same reference characters will be used in FIG. 13 to identify these similar components. These common components will be discussed herein only to the extent necessary for a complete understanding of the circuit 370.

FIG. 13 shows that the lockout circuit 370 contains a transistor 372 that is used in place of the SCR 216 in the circuits 250 and 300 described above. This transistor 372 is driven by a control circuit 374 that is similar in basic purpose but different in construction detail from the control circuit 264 described above.

In addition, the lockout circuit 370 comprises an indicator circuit 376 that is configured to provide the user with a visual indication of whether the telephone device attached to the circuit 370 is connected to the line.

Referring initially to the control circuit 374, in addition to the trigger capacitor 270, Zener diode 272, holding capacitor 274, transistors 278, 280, and 282, all of which were described above, this circuit 374 comprises: a diode 378, a resistor 380, transistors 382 and 384, a resistor 386, and a Zener diode 388.

The anode of the diode 378 is connected to the collectors of the transistors 280 and 282. The cathode of this resistor 378 is connected to the emitter of the resistor 382. The resistor 380 is connected between the emitter and base of the transistor 382. The emitter of the transistor 384 is connected to the base of the transistor 382, while the base of the transistor 384 is connected to the collector 382. The collector of the transistor 384 is connected to the base of the transistor 372. The resistor 386 is connected from the collector of the transistor 382 to the circuit node 268. The collector of the transistor 372 is connected to the anode of the Zener diode 362, while the emitter of the transistor 372 is connected to the second circuit node 368. The Zener diode 388 is connected between the cathode of the Zener diode 272 and the second circuit node 268.

So configured, the circuit 374 controls the transistor 372 to allow current to flow or prevent current from flowing between the first and second circuit nodes 266 and 268 under the same conditions as current is allowed to flow between these nodes in the circuits 250 and 300 as described above.

In particular, when an appropriate base current is applied to the transistor 372, this element 372 allows current to flow through its collector and out its emitter. When this base current is not available, the transistor 372 is in an off state in which current may not flow through the collector emitter circuit. Accordingly, configured as shown and described with relation to FIG. 13, the transistor 372 forms a switch that performs the same function as the SCR 260 described above.

As generally described above, the trigger capacitor 270, Zener diode 272, transistor 278, and resistor 310 supply the appropriate base current to the transistor 372 when the attached telephone device connects to the telephone line as generally described above. The only difference in construction and operation of the trigger circuit formed as just described with the one of circuit 300 is the use of the Zener diode 388 to provide over-voltage protection for the base of the transistor 278. And as described above, the collector current of the transistor 278 is drawn through the base circuit of the transistor 280; this begins to charge the holding capacitor 274 through the blocking diode 378.

When an appropriate base current is applied to the transistor 372, this transistor 372 is on, and, if the telephone line voltage is sufficient, current begins to flow through diode 306. The corresponding voltage across the diode 306 biases the transistor 282 on, which in turn completes the charging of the holding capacitor 274 through the blocking diode 278. The charge on the holding capacitor 274 latches the transistor 372 into its on state through a constant current source created by the transistors 382 and 384. The transistor 372 will unlatch only when the holding capacitor 274 becomes discharged to below a predetermined level. The voltage across the holding capacitor 274 drops below this predetermined level only if the current flowing through the diode 306 falls to zero, such as when either the Zener diode 262 blocks the loop current as described above, or the attached telephone device is disconnected from the circuit.

The constant current source formed by the transistors 382 and 384 will now be described. The current flowing through the resistor 380 establishes the biasing level of the transistor 382, which, via its current gain, fixes the bias level of the transistor 384 via the resistor 386. Consequently, the current passing through the transistor 382 and into the base circuit of the transistor 372 is independent of the voltage across the holding capacitor 274 and is controlled by the resistance value of the resistor 380.

The holding capacitor 274 is thus linearly discharged under the conditions described above, enabling the circuit 370 to be constructed with a holding capacitor of a comparatively small capacitance value. This constant current source also cuts off base current to the transistor 372 when the voltage between the nodes 366 and 368 because of biasing required by the base circuits of the transistors 382 and 384.

From the foregoing description, it should be clear that the circuit 370 will, under normal circumstances, perform the same purpose as the circuits 250 and 300 described above, and a detailed discussion of the system level functioning of the circuit 370 will not be repeated.

In addition to the alternate method of forming a switch circuit, the circuit 370 has incorporated therein the indicating circuit 376 introduced above. This circuit 376 comprises a transistor 390, resistor 392, and LED 394. The transistor 390 is configured such that current flowing from the diode bridge 312 to the diode 306 passes through the emitter and out the collector of the transistor 390. The resistor 392 is connected between the emitter and base of the transistor 390, and the LED 394 is connected between the base and collector of the transistor 390.

With the indicating circuit 376 configured as described above, the LED 394 will light to provide a visual indication to the telephone line user of the status of the lockout module incorporating the circuit 370. The transistor 390 and resistor 392 allow the LED 394 to indicate the status of the circuit 370 while at the same time bypassing excess current around this LED when the loop current exceeds the LED's recommended maximum operating level.

In particular, the transistor 390 will shunt excess line current through its emitter collector circuits. The level of this bypass current is established by the resistor 392. Current flowing through the LED 394 creates a voltage drop across the resistor 392. As the current through the LED 394 increases, the voltage drop across the resistor 390 increases until the transistor 392 begins to bias on, and a small portion of the LED current begins to flow through the emitter base circuit of the transistor 390. The current gain of the transistor 390 increases current flow between its emitter and collector.

Accordingly, the current gain of the transistor 390 results in a bypass current flowing through the emitter collector circuit thereof that prevents damage to the LED 394 when the loop current exceeds the recommended maximum operating level thereof. The indicating circuit 376 thus forms a reliable and consistent means for indicating the status of the lockout circuit 370 and thus the lockout module in which it is contained.

One of ordinary skill in the art will recognize that the indicating circuit 376 can be incorporated into any of the lockout circuits described above. The circuit 370 also illustrates that the fundamental logic of the present invention can be implemented specific forms other than those described above yet still accomplish the goals of the present invention.

9. Ninth Exemplary Lockout Circuit

Referring now to FIG. 14, depicted therein is yet another exemplary lockout circuit 396 constructed in accordance with, and embodying, the principles of the present invention. This lockout circuit 396 operates in almost exactly the same manner as the circuit 370 described above. To the extent that components of the circuit 396 are common with those of the circuits 250, 300, and/or 370, the same reference characters will be used in FIG. 13 to identify these similar components. These common components will be discussed herein only to the extent necessary for a complete understanding of the circuit 396.

The indicating circuit 376 has been moved in the circuit 396 to between the diode 306 and the Zener diode 362. So placed, the circuit 376 performs in almost exactly the same manner as it does in the circuit 370, but provides an additional advantage of allowing the value of the holding capacitor 274 to be smaller.

In addition to the other components of the circuit 370, the lockout circuit 376 further comprises a manually operated switch 398 that effectively allows the one of the two Zener diodes 262 and 352 to be removed from the circuit 396, thereby changing the total offset voltage introduced by the circuit 396.

In particular, when the switch 398 is open, current flowing from the first circuit node 266 to the second circuit node 268 flows through both the Zener diode 352 and the Zener diode 262; the total offset voltage introduced by the circuit 396 when the switch 398 is open will thus be primarily determined by the breakdown voltages of the two Zener diodes 352 and 262.

But when the switch 398 is closed, current will bypass the diode 352. The offset voltage will thus be determined primarily by the Zener diode 262; the Zener diode 352 will not contribute any to the offset voltage of the circuit 396 when the switch 398 is closed.

The switch 398 thus allows the user or installer to determine the total offset voltage introduced by the circuit 396 and thus set the priority of this circuit 396. With the switch 398 open, a telephone device attached through the circuit 396 will be assigned a relatively lower, or third level, priority; with this switch 398 closed, the attached telephone device will be assigned a relatively higher, or second level, priority.

The use of lockout modules including the lockout circuit 396 allows telephone devices to be assigned to second or third priority levels as just discussed or to a first priority level by directly attaching a telephone device to the line. Three levels of priority may thus be obtained with only one type of lockout module. This simplifies manufacturing and inventory procedures because it may be possible to manufacture all lockout modules using only one lockout circuit.

C. Line Conditioning Lockout Circuit

As generally discussed above, modern security panels are programmable to take control of a telephone line and force it out of a high and dry condition. Certain older security panels are not programmable in this manner.

To allow these older style security panels to take control of a high and dry line in conjunction with the use of the lockout modules 40, such panels may be provided with a line conditioning circuit such as that depicted at 420 in FIG. 11.

The purpose of the line conditioning circuit 420 is to disconnect the security panel 34 from the line 24 for a predetermined time period and then, a predetermined time period later, reconnect the security panel 34 to the line 24. This emulates the action necessary to have the telephone network 22 release a high and dry line.

More specifically, the circuit 420 comprises first and second timing circuits 422 and 424, first and second dual relays 426 and 428, and first and second resistors 430 and 432. Based on a ground start trigger signal generated by the security panel 34, the first timing circuit 422 generates a pulse that operates the first dual relay 426 to momentarily place the resistors 430 and 432 across first and second local telephone lines 434 and 436.

And based on the pulse generated by the first timing circuit, the second timing circuit 424 generates a pulse that operates the second dual relay 428 to disconnect the security panel 434 from the lines 434 and 436 and then reconnect the security panel to the lines 434 and 436 when the resistors 430 and 432 are no longer connected to the lines 434 and 436. This emulates the connection of a telephone device to these lines 434 and 436.

The timing circuits 422 and 424 are conventional and will be discussed herein only briefly. The circuit 422 comprises a timer 434, resistors 436 and 438, and capacitors 440 and 442. The circuit 424 comprises a timer 444, resistors 446 and 448, and capacitors 450 and 4522. It is well within the skill level of one ordinary skill in the art to select the values of the resistors 436, 438, 446, and 448 and capacitors 440, 442, 450, and 452 such that the circuits 422 and 424 function as described above.

The ground start trigger signal is coupled to the input of the timer 434 by a capacitor 454. A diode 456 and capacitors 458 and 460 form a filtered power supply. Diodes 462 and 464 are back EMF clamping diodes that are connected across the inputs of the relays 428 and 426.

D. System Design Variations

In the foregoing discussion, several different lockout circuits were described. Not all of the lockout modules in a given integrated telephone/security system need be identical; to the contrary, different lockout circuits may be provided in one system to allow the system to be tailored for different customer needs.

For example, a lockout circuit with limited voice pass through is not needed when the telephone device connected thereto does not require or employ a voice signal. And devices that are not likely to be inadvertently left connected to the line, such as modems and the like, perhaps do not require a delayed switch to allow recovery from high and dry mode. Such a circuit may be used in the same system with lockout circuits that do allow recovery of high and dry lines when other devices are susceptible to this condition.

Additionally, as described above, a low priority device such as an answering machine need not be given the same priority as other devices. In this case, the breakdown voltage of the offset and control Zener diode connected to the lowest priority device may be set at a higher level (by, for example, providing one or more Zener diodes as shown in FIG. 10) than that of the offset and control Zener diodes connected to other devices. The telephone device attached to the line through a lockout module the Zener diodes of which have the highest cumulative offset voltages will be disconnected when a device associated with a Zener diode having a lower offset voltage connects to the line. This gives at least one additional level of priority with which the various telephone devices may be associated.

As shown in the histogram of FIG. 12, the use of different offset voltages can create three or more levels of priority among the various devices:

- a first, highest, priority identified by reference character 520 is given to devices, such as the security panel, that must have exclusive access to the line when required;
- a second, middle, priority identified by reference character 522 can be given to devices that need to grab and hold a line against all but the highest priority devices; and
- a third, lowest, priority identified by reference character 524 can be given to devices, such as answering machines, that simply answer incoming calls, but should be disconnected from the line when their function is overridden by another device.

A fourth priority device may be provided as shown at 526 in FIG. 12

A telephone taking precedence over an answering machine is one common situation in which one or more additional levels of priority may be used.

At a system level, then, the present invention can be tailored as appropriate for a given situation by mixing and matching different lockout circuits as described above and, within a given lockout circuit, selecting the values of the various components to provide different functionality based on requirements. This can be accomplished by manufacturing different lockout circuits, each having a different priority ranking, or one lockout circuit having a switch that allows the selection of one priority ranking from a plurality of such rankings.

E. Preferred Components and Acceptable Alternatives

The following Table A indicates specific parts that may be used for the certain of the electrical components discussed and acceptable alternatives to those parts.

TABLE A

| ELEMENT | PREFERRED EMBODIMENT | ALTERNATIVES |
|---|---|---|
| STS 60, 222 | bilateral silicon trigger switch | bilateral trigger dial SCR, triac, SCS, GTO, UJT, PUT, Shockley diode, SUS, SBS |

TABLE A-continued

| ELEMENT | PREFERRED EMBODIMENT | ALTERNATIVES |
|---|---|---|
| offset Zener diodes 62, 224, 226, 352, 354 | Zener diode 3.1 to 35 v. | silicon diodes in series various analog IC function blocks such as voltage regulators and Op amps |
| SCR 260 | Darlington transistor | high voltage high gain transistor, gated thyristor |

From the foregoing, it should be clear that the invention may be embodied in other specific forms without departing from the spirit or essential characteristics thereof. The present embodiments are therefore to be considered in all respects as illustrative and not restrictive.

We claim:

1. A lockout circuit for allowing a security system to access a telephone line connected to at least one telephone device, comprising:

first and second circuit nodes connected in series with each telephone device such that a terminal voltage is present across the first and second circuit nodes; and voltage offset means for creating an offset voltage between the first and second nodes, where the offset voltage has a first predetermined voltage level; and latch means in series with the voltage offset means for allowing current to flow between the first and second circuit nodes only if current begins flowing through the latch means when the terminal voltage is above a second predetermined voltage level.

2. A lockout circuit as recited in claim 1, further comprising switch means connected in series with the offset means, where the switch means opens after the terminal voltage goes below a third predetermined voltage and closes a predetermined time period after the terminal voltage exceeds the third predetermined voltage.

3. A lockout circuit as recited in claim 1, further comprising a diode bridge connected between the lockout circuit and the telephone line.

4. A lockout circuit as recited in claim 1, in which the voltage offset means comprises a Zener diode, where the first predetermined voltage level is determined by a breakdown voltage of the Zener diode.

5. A lockout circuit as recited in claim 1, in which the voltage offset means comprises first and second Zener diodes the cathodes of which are connected together.

6. A lockout circuit as recited in claim 1, in which the latch means comprises at least one circuit device selected from a group consisting of a silicon trigger switch, a diac, a thyrister, and a transistor.

7. A lockout circuit as recited in claim 2, in which the second switch means comprises a switch circuit connected in series with the voltage offset means and a control circuit for controlling the switch circuit.

8. A lockout circuit as recited in claim 7, in which the control circuit comprises a Zener diode and an RC circuit, where the third predetermined voltage is determined by a breakdown voltage of the Zener diode and the first predetermined time period is determined by a time constant associated with the RC circuit.

9. A lockout circuit for allowing a security system to access a telephone line connected to at least one telephone device, comprising:

first and second circuit nodes connected in series with each telephone device such that a terminal voltage is present across the first and second circuit nodes; and voltage offset means for creating an offset voltage between the first and second nodes, where the offset voltage has a first predetermined voltage level; and switch means connected in series with the offset means, where the switch means opens a first predetermined time period after the terminal voltage goes below a second predetermined voltage level and closes a second predetermined time period after the terminal voltage exceeds the second predetermined voltage level.

10. A lockout circuit as recited in claim 9, further comprising a diode bridge connected between the lockout circuit and the telephone line.

11. A lockout circuit as recited in claim 9, in which the voltage offset means comprises a Zener diode, where the first predetermined voltage level is determined by a breakdown voltage of the Zener diode.

12. A lockout circuit which recited in claim 9, in which the switch means comprises a switch circuit connected in series with the offset means and a control circuit for controlling the switch circuit.

13. A lockout circuit as recited in claim 12, in which the control circuit comprises a Zener diode and an RC circuit, where the second predetermined voltage level is determined by a breakdown voltage of the Zener diode and the first predetermined time period is determined by a time constant associated with the RC circuit.

14. A method of connecting a security system to a telephone line comprising first and second conductors, the method comprising the steps of:

connecting a dialer portion of the security system to the telephone line;

providing a lockout circuit for each telephone device connected to the telephone line, where each lockout circuit comprises voltage offset means for creating an offset voltage having a first predetermined voltage level, and switch means connected in series with the offset means, where the switch means opens after the terminal voltage goes below a second predetermined voltage level and closes a predetermined time period after the terminal voltage exceeds the second predetermined voltage level; and connecting one of the lockout circuits in series with each of the telephone devices.

15. An integrated telephone/security system, comprising:

a telephone network for transmitting telephony signals;

a first telephone line at a local premises, the first telephone line being connected to the telephone network;

a second telephone line at a remote premises, the second telephone line being connected to the telephone network;

a remote telephone device at the remote premises, the remote telephone device being connected to the second telephone line;

a security system for detecting security conditions at the local premises, the security system comprising dialer means connected to the first telephone line for transmitting security data indicative of detected security conditions to the remote telephone device;

at least one local telephone device at the local location;

a lockout circuit associated with each local telephone device, each lockout circuit being connected in series with its associated local telephone device; wherein each lockout circuit comprises offset means for creating an offset voltage having a first predetermined voltage level, where the offset means is connected in series with the local telephone device;

the first predetermined level is selected such that, when the dialer means connects to the local telephone line, a voltage across the local telephone devices is insufficient to allow the local telephone devices to connect to the local telephone line, thereby providing the dialer means with exclusive access to the local telephone line; and latch means in series with the voltage offset means for allowing current to flow to the associated local telephone device only if current begins flowing through the latch means when the terminal voltage is above a second predetermined voltage.

16. An integrated system as recited in claim 14, further comprising switch means connected in series with the offset means, where the switch means is operable to prevent current from flowing through the associated local telephone device.

17. An integrated system as recited in claim 16, in which the switch means prevents current from flowing to the associated local telephone device for a first predetermined time period after the terminal voltage goes below a third predetermined voltage level.

18. An integrated system as recited in claim 14, further comprising switch means connected in series with the offset means, where the switch means prevents current from flowing to the associated local telephone device for a first predetermined period after the terminal voltage goes below a third predetermined voltage level.

19. An integrated system as recited in claim 14, in which the offset means comprises a Zener diode, where the first predetermined voltage level is determined by a breakdown voltage of the Zener diode.

20. An integrated system as recited in claim 14, in which the offset means comprises first and second Zener diodes the cathodes of which are connected together.

21. An integrated system as recited in claim 14, in which the latch means comprises a device selected from the group consisting of a silicon trigger switch, and a transistor.

22. An integrated system as recited in claim 17, in which the switch means comprises a switch circuit connected in series with the first switch means and a control circuit for controlling the switch circuit.

23. An integrated system as recited in claim 22, in which the control circuit comprises a Zener diode and an RC circuit, where the third predetermined voltage is determined by a breakdown voltage of the Zener diode and the first predetermined time period is determined by a time constant associated with the RC circuit.

24. A method of connecting a security system to a telephone line comprising first and second conductors, the method comprising the steps of:

connecting a dialer portion of the security system to the telephone line;

providing a lockout circuit for each telephone device connected to the telephone line, where each lockout circuit comprises voltage offset means for creating an offset voltage having a first predetermined voltage level, and latch means in series with the voltage offset means for allowing current to flow between the first and second circuit nodes only if current begins flowing through the latch means when the terminal voltage is above a second predetermined voltage level; and connecting one of the lockout circuits in series with each of the telephone devices.

25. A lockout device for allowing a security system to access a telephone line having first and second line conductors connected to first and second telephone conductors of at least one telephone device, comprising:

first, second, and third circuit conductors;

a first connector assembly for connecting the first and second circuit conductors to the first and second line conductors;

a second conductor assembly for connecting the first and third circuit conductors to the first and second telephone conductors;

a diode bridge having first, second, third, and fourth bridge nodes, where the first and third bridge nodes are connected to the second and third circuit conductors;

first and second circuit nodes connected to the second and fourth bridge nodes; and a first Zener diode connected between the first and second circuit nodes, where the Zener diode allows current to flow between the first and second circuit nodes when a voltage across the circuit nodes is above a first predetermined voltage level and prevents current from flowing between the first and second circuit nodes when the voltage across the circuit nodes is below the first predetermined voltage level.

26. A lockout device as recited in claim 25, further comprising:

a switch circuit connected in series with the first Zener diode; and a control circuit for operating the first switch circuit to allow current to flow between the first and second circuit nodes a predetermined time period after the voltage across the first and second circuit nodes goes above a second predetermined voltage level and to prevent current from flowing between the first and second circuit nodes when the voltage across the first and second circuit nodes goes below the second predetermined voltage level.

27. A lockout device as recited in claim 26, in which the control circuit comprises:

a control resistor and control capacitor connected in series across the first and second circuit nodes such that the capacitor is charged by the voltage across the first and second circuit nodes; and a second Zener diode connected between the control capacitor and the switch circuit such that when a control voltage across the control capacitor exceeds the breakdown voltage of the second Zener diode current flows through the second Zener diode, thereby controlling the switch circuit to allow current to flow between the first and second circuit nodes.

28. A lockout device as recited in claim 27, further comprises a silicon trigger switch arranged in series with the first Zener diode between the first and second circuit terminals, where the silicon trigger switch allows current to flow between the first and second circuit terminals if current begins flowing through the silicon trigger switch when the voltage across the first and second circuit nodes exceeds a third predetermined voltage level.

29. A lockout module for providing access to a telephone line to one of a plurality of telephone devices, where the telephone line comprises first and second telephone line conductors and the telephone devices are each assigned to one of a plurality of priority levels including a first, relatively higher, priority level and a second, relatively lower, priority level, the lockout module comprising:

connecting means for connecting the module in line with an attached telephone device assigned to the second priority level such that current flowing through the first and second conductors to the attached telephone device flows through the lockout module;

first and second circuit nodes connected to the first telephone line conductor;

offset means for establishing an offset voltage between the first and second circuit nodes, where the offset means effectively disconnects the attached telephone device from the telephone line when the voltage across the first and second circuit nodes falls below a predetermined offset voltage level; and switch means arranged in series with the offset means for selectively allowing current flow between the first and second circuit nodes in response to a control signal; and control means for generating the control signal.

30. A lockout module as recited in claim 29, further comprising indicating means for indicating whether current is flowing to the attached telephone.

31. A lockout module as recited in claim 30, in which the indicating means comprises a light-emitting diode and shunt means for shunting excess current around the light-emitting diode.

32. A lockout module as recited in claim 31, in which the shunt means comprises a transistor and a resistor, where the light-emitting diode is connected between the base and the collector of the transistor and the resistor is connected between the between the emitter and the base of the transistor.

33. A lockout module as recited in claim 29, control means generates the control signal if no other telephone device has been connected to the telephone line for a predetermined period of time before the attached telephone device attempts to connect to the telephone line.

34. A lockout module as recited in claim 33, in which the control means comprises trigger means for generating a trigger signal based on a voltage across the first and second telephone line conductors, where the control means generates the control signal whenever the trigger signal is present.

35. A lockout module as recited in claim 34, in which the trigger means generates the trigger signal when the voltage across the first and second telephone line conductors exceeds a predetermined trigger voltage for a predetermined trigger charge period.

36. A lockout module as recited in claim 35, in which the trigger means generates the trigger signal for a predetermined trigger discharge period after the voltage across the first and second telephone line conductors falls below the predetermined trigger voltage.

37. A lockout module as recited in claim 36, in which the trigger means comprises a trigger capacitor and a trigger Zener diode connected in series between the first and second telephone line conductors such that the trigger capacitor is charged by a voltage across the first and second telephone line conductors and the trigger Zener diode generates the trigger signal as long as (a) the attached telephone device connects to the telephone line and (b) a voltage across the trigger Zener diode exceeds a breakdown voltage of the trigger Zener diode.

38. A lockout module as recited in claim 36, in which the control circuit comprises latch means for generating a latch signal a predetermined latch charge period after the attached telephone device has connected to the telephone line, where the control circuit generates the control signal whenever the latch signal is present.

39. A lockout module as recited in claim 38, in which the predetermined latch charge period is shorter than the predetermined trigger discharge period.

40. A lockout module as recited in claim 29, in which the control means comprises latch means for generating a latch signal a predetermined latch charge period after the attached telephone device has connected to the telephone line, where the control circuit generates the control signal whenever the latch signal is present.

41. A lockout module as recited in claim 40, in which the latch means comprises a holding capacitor that begins charging when the attached telephone device connects to the telephone line and is discharged when the attached telephone device disconnects from the telephone line.

* * * * *